(12) United States Patent
Smith et al.

(10) Patent No.: US 12,022,965 B2
(45) Date of Patent: Jul. 2, 2024

(54) DISPLAY ASSEMBLIES

(71) Applicant: ALL PLASTIC, INC., Rancho Cordova, CA (US)

(72) Inventors: William Thomas Smith, Fair Oaks, CA (US); Cheryl Ann Smith, Fair Oaks, CA (US)

(73) Assignee: ALL PLASTIC, INC., Rancho Cordova, CA (US)

( * ) Notice: Subject to any disclaimer, the term of this patent is extended or adjusted under 35 U.S.C. 154(b) by 0 days.

(21) Appl. No.: 18/239,634

(22) Filed: Aug. 29, 2023

(65) Prior Publication Data

US 2023/0397743 A1  Dec. 14, 2023

Related U.S. Application Data

(60) Division of application No. 17/870,134, filed on Jul. 21, 2022, now Pat. No. 11,771,238, and a continuation-in-part of application No. 29/800,501, filed on Jul. 21, 2021, and a continuation-in-part of application No. 29/808,215, filed on Sep. 17, 2021, and a continuation-in-part of application No. 29/819,653, filed on Dec. 16, 2021.

(60) Provisional application No. 63/224,235, filed on Jul. 21, 2021.

(51) Int. Cl.
*A47F 3/00* (2006.01)
*A47F 3/14* (2006.01)
*A47F 5/16* (2006.01)
*G06F 1/16* (2006.01)
*G06K 7/00* (2006.01)

(52) U.S. Cl.
CPC .............. *A47F 3/001* (2013.01); *A47F 3/145* (2013.01); *A47F 5/16* (2013.01); *G06F 1/1605* (2013.01); *G06K 7/00* (2013.01)

(58) Field of Classification Search
CPC .. A47F 3/001; A47F 3/145; A47F 5/16; G06F 1/1605; G06K 7/00
See application file for complete search history.

(56) References Cited

U.S. PATENT DOCUMENTS

| | | | |
|---|---|---|---|
| 8,056,740 B2 * | 11/2011 | Weshler | A47F 7/024 |
| | | | 340/568.1 |
| 9,125,501 B2 | 9/2015 | Reynolds | |
| 9,630,747 B2 | 4/2017 | Smith | |
| 11,399,640 B2 * | 8/2022 | Berglund | E05B 73/0005 |
| 2016/0335859 A1 * | 11/2016 | Sankey | G08B 13/1409 |

* cited by examiner

Primary Examiner — Thomas M Sember

(57) ABSTRACT

An illuminable display assembly including (a) a housing having a base securable to a support surface, a platform detachably mounted to the base, and a generally enclosed interior bounded from above by the platform. The platform includes a plurality of illuminable windows spaced apart from each other therealong. The display assembly further includes (b) a plurality of retractable tethers mounted to the platform in the interior of the housing. The tethers fasten corresponding display containers to the platform and urge the display containers to predetermined positions adjacent corresponding windows. The display assembly further includes (c) a lighting system including one or more interior light sources in the interior of the housing for illuminating the windows and display containers from below.

11 Claims, 26 Drawing Sheets

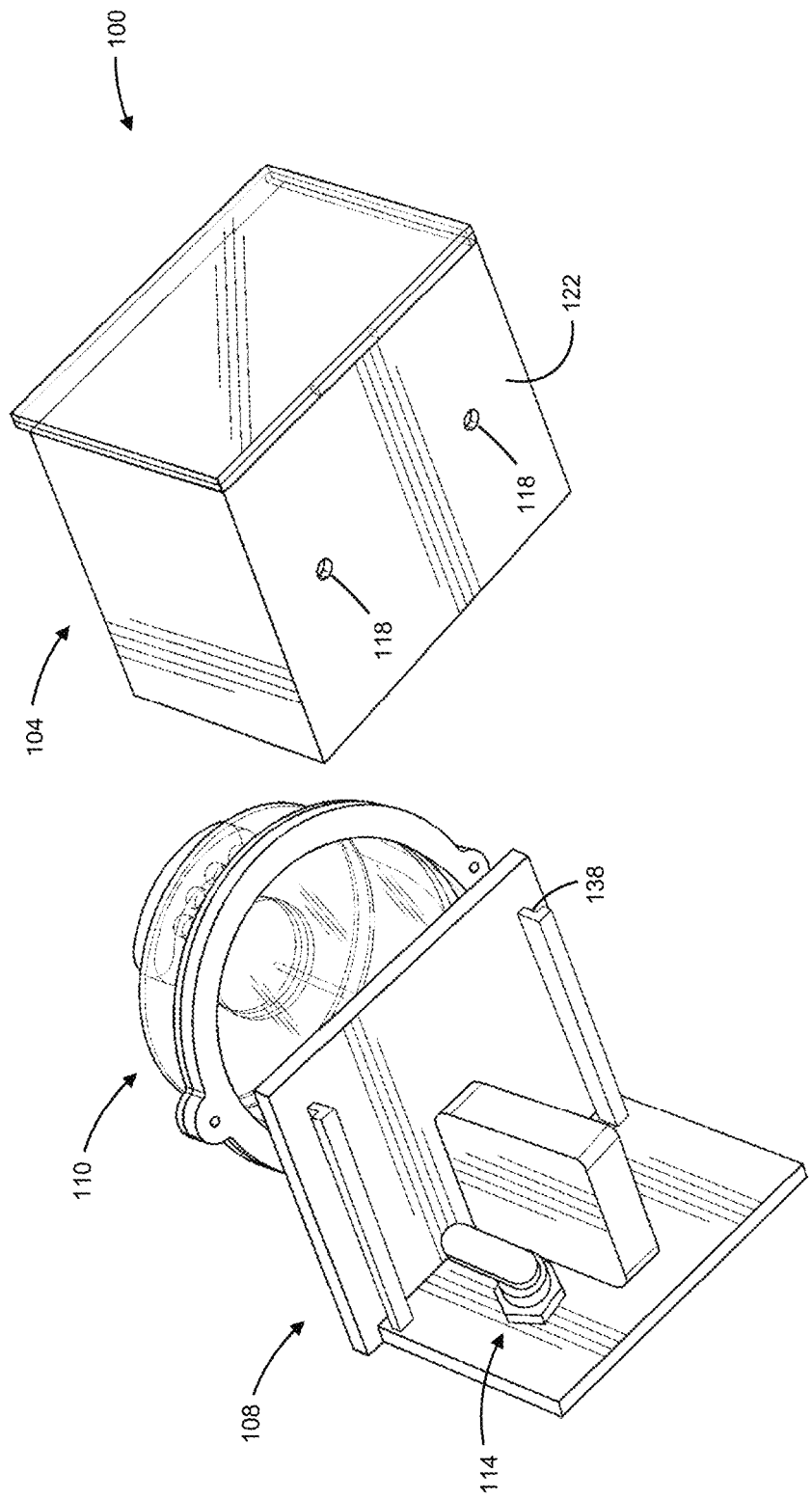

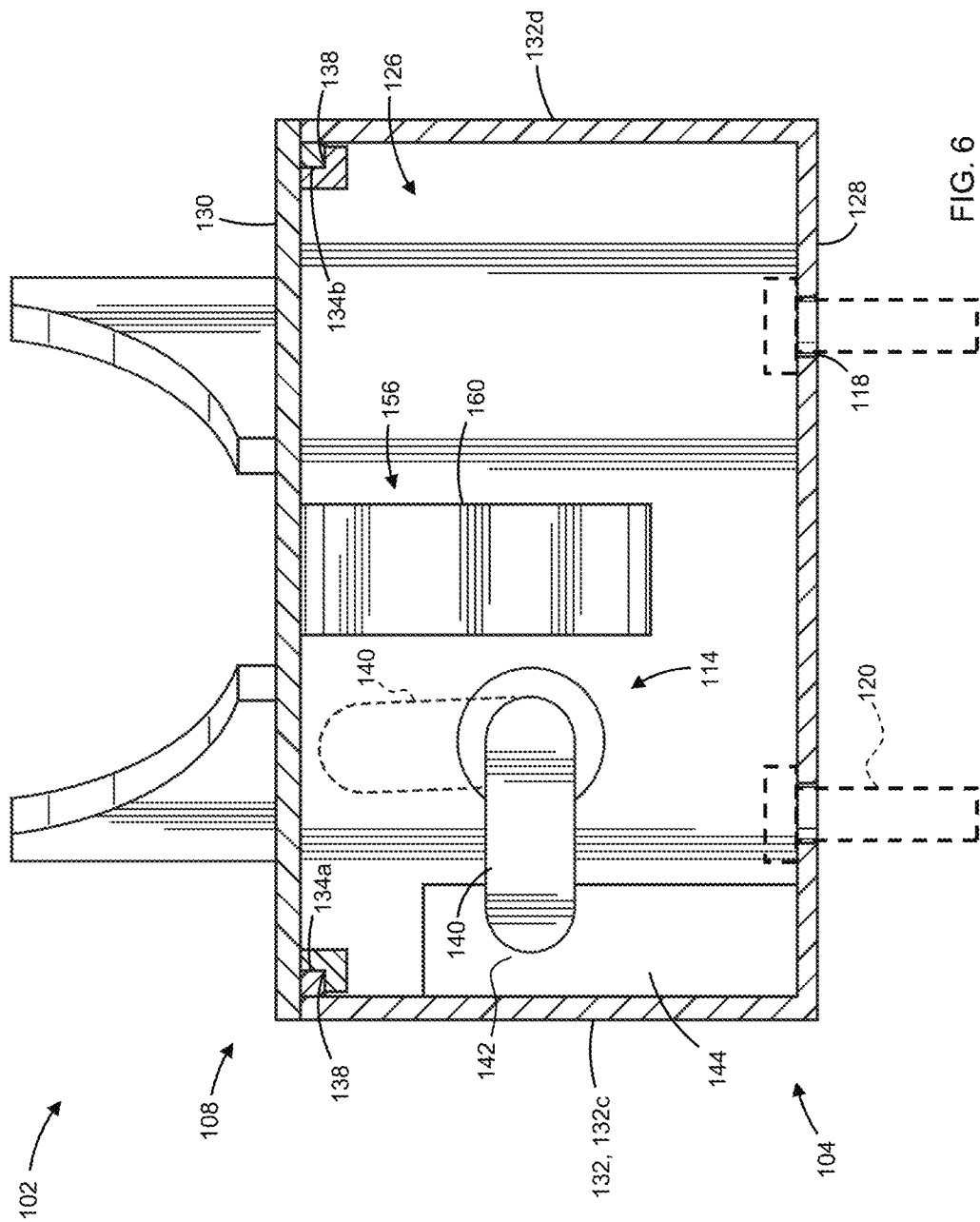

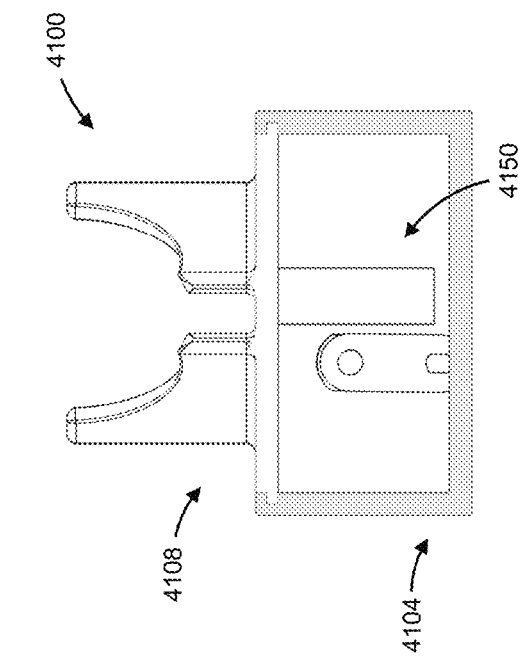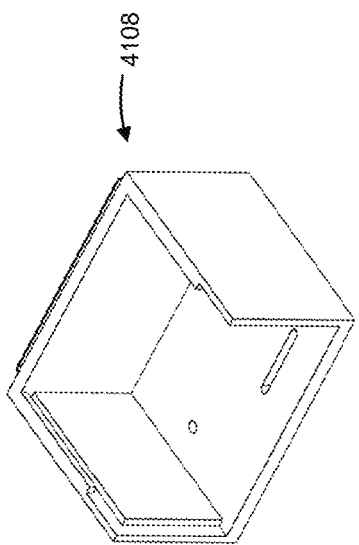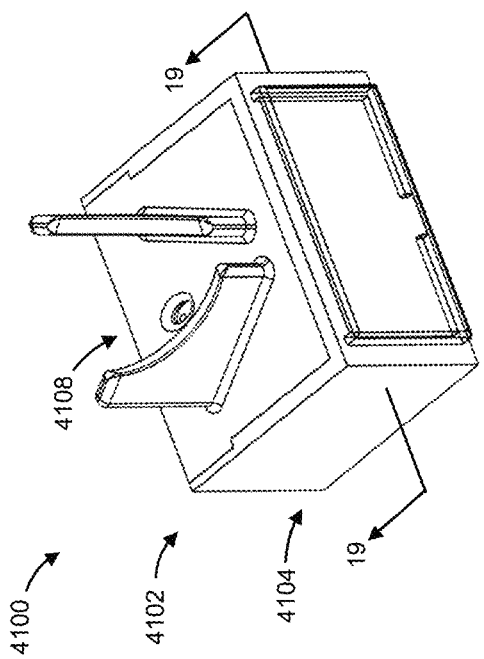
FIG. 17
FIG. 18
FIG. 19

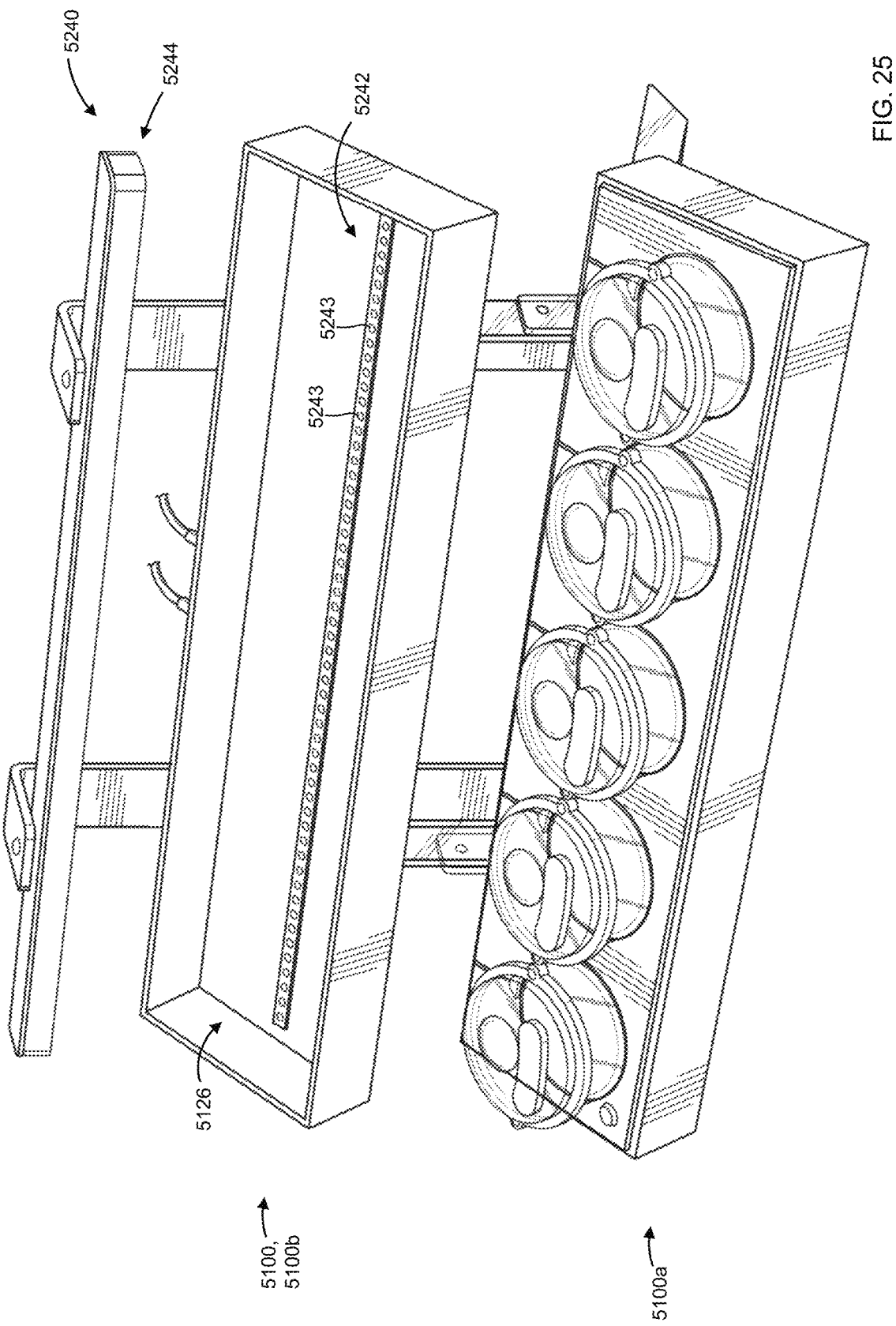

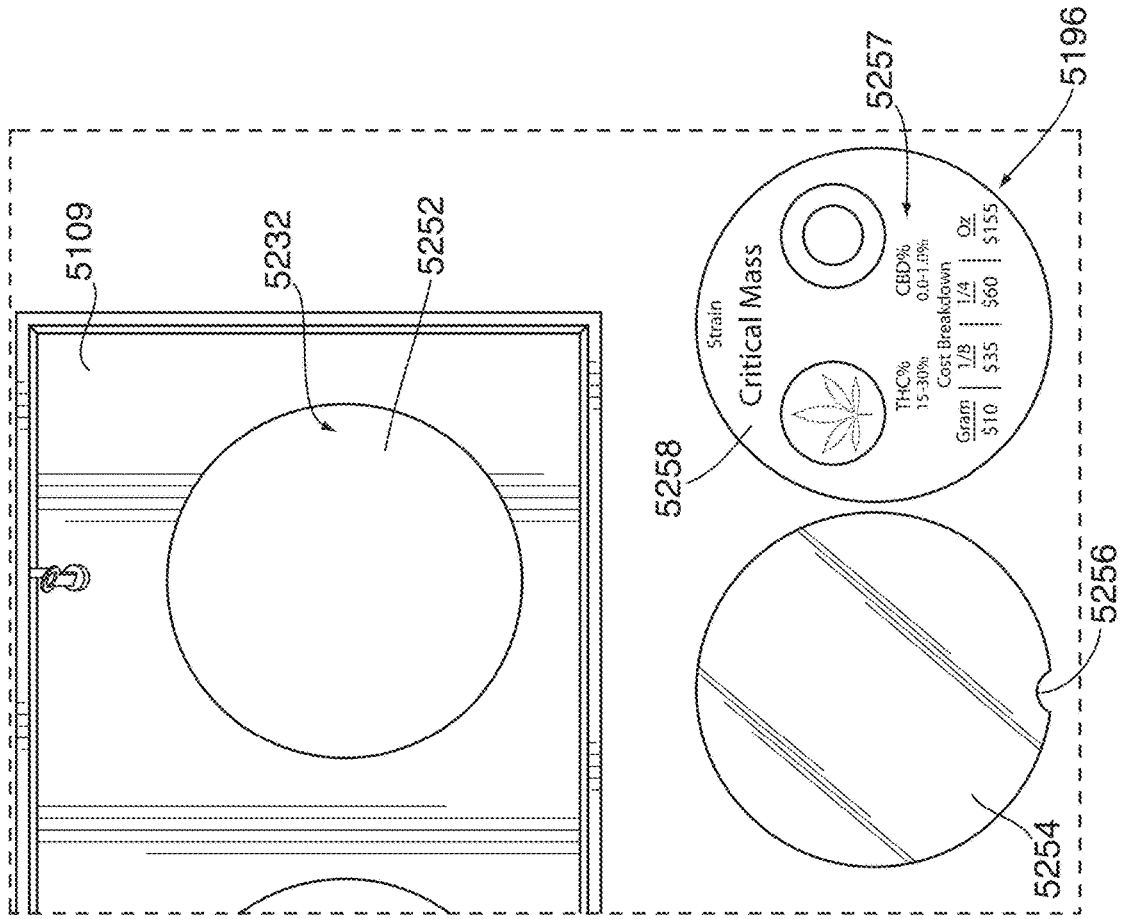
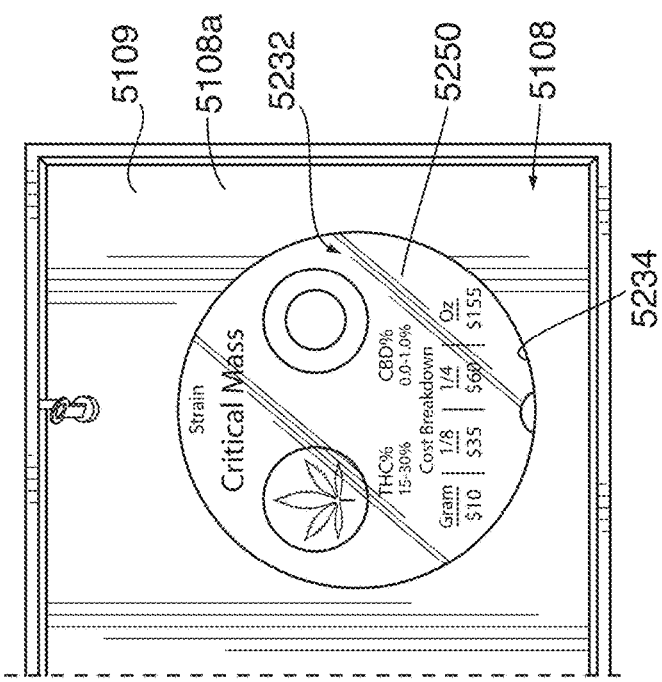

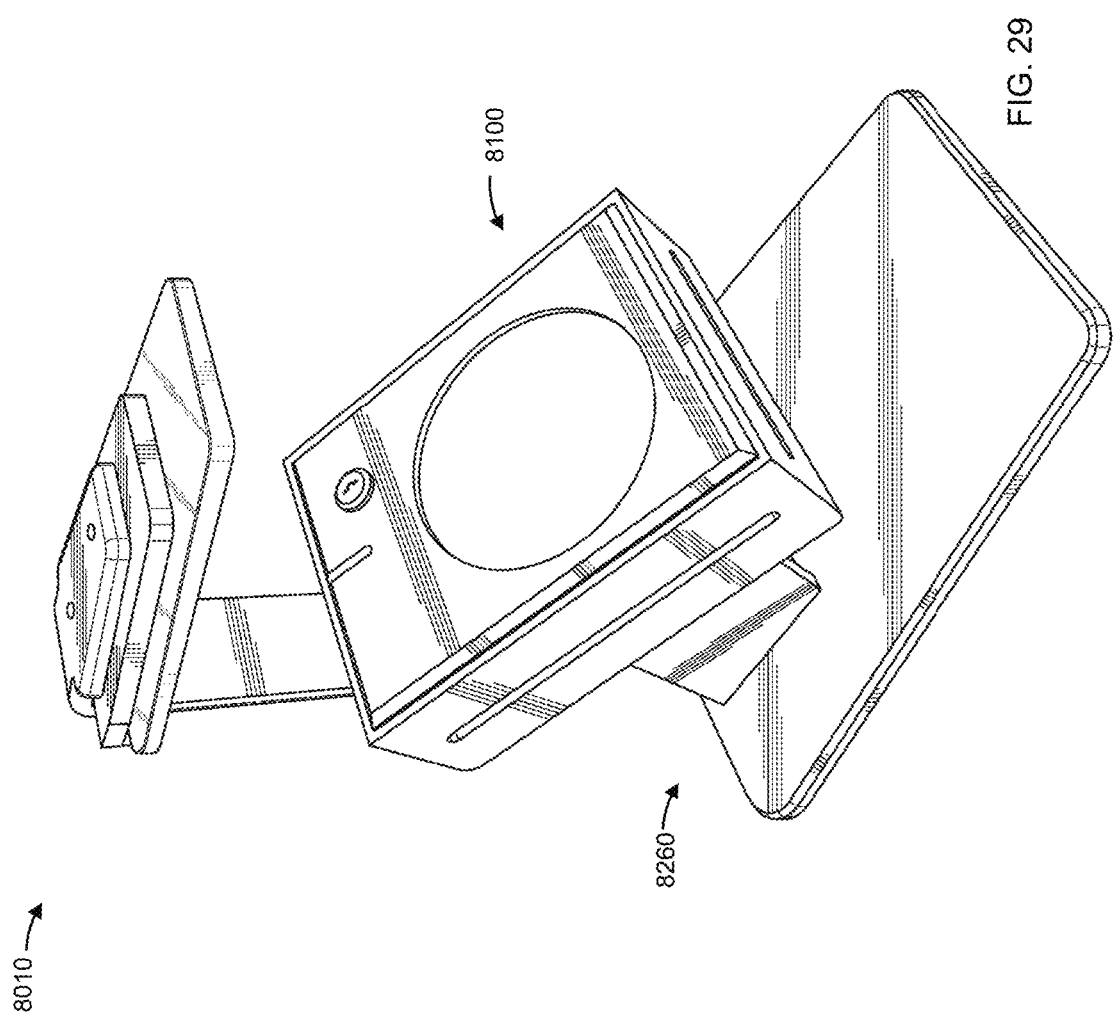

DISPLAY ASSEMBLIES

CROSS-REFERENCE TO RELATED APPLICATIONS

This United States Patent Application is a divisional application of U.S. Non-Provisional patent application Ser. No. 17/870,134 filed on Jul. 21, 2022, which: (1) claims the benefits of U.S. Provisional Patent Application No. 63/224,235 filed on Jul. 21, 2021, (2) is a continuation-in-part of U.S. Design patent application Ser. No. 29/800,501 filed on Jul. 21, 2021, (3) is a continuation-in-part of U.S. Design patent application Ser. No. 29/808,215 filed on Sep. 17, 2021, and (4) is a continuation-in-part of U.S. Design patent application Ser. No. 29/819,653 filed on Dec. 16, 2021; each of which are hereby incorporated herein by reference in their entireties.

FIELD

The specification relates generally to display of articles, and more specifically, to display assemblies for displaying articles.

BACKGROUND

U.S. Pat. No. 9,630,747 B2 (Smith et al.) discloses a container for displaying, visualizing, and aroma sampling botanical materials—such as tea, cannabis, and the like including a container body, lid, and lens. The container body is shaped to define a mounting projection wherein a sample, such as a botanical sample, may be held. The container body and lid form an airtight seal. A sample may be visualized through the lens. In a preferred embodiment, the lid is shaped to define scent openings permitting aroma sampling of a sample contained within.

SUMMARY

The following summary is intended to introduce the reader to various aspects of the applicant's teaching, but not to define any invention.

According to some aspects, an illuminable display assembly includes: (a) a housing including a base securable to a support surface and a platform detachably mounted to the base, the base and platform defining a generally enclosed interior of the housing, and the platform including a plurality of illuminable windows spaced apart from each other along the platform, each window having an interior surface facing the interior of the housing and an exterior surface opposite the interior surface; (b) a plurality of display containers supported by the platform at predetermined locations overtop corresponding windows, at least a portion of each display container being generally transparent for viewing one or more articles containable therein for display; (c) one or more tether ports extending through the housing between the interior and an exterior of the housing; (d) a plurality of retractable tethers mounted to the platform in the interior of the housing, the tethers extending through the one or more tether ports and fastening corresponding display containers to the platform, and each tether permitting limited movement of a corresponding display container away from a corresponding predetermined location to facilitate viewing of the articles and urging the display container back to the predetermined location; and (e) a lighting system including one or more interior light sources in the interior of the housing under the windows for illuminating the windows from below.

In some examples, each predetermined location is defined by a seat for supporting a corresponding display container at the predetermined location.

In some examples, the platform has a top surface and each seat comprises a seat recess in the top surface of the platform for receiving a bottom portion of the display container therein, each seat recess bounded from below by a corresponding window.

In some examples, each seat recess corresponds in shape and size to a bottom portion of the display container for nesting of the bottom portion in the seat recess overtop the window.

In some examples, the platform includes a panel portion and a plurality of apertures spaced apart from each other along the platform and passing through the panel portion between the interior and the exterior of the housing, and each window extends across a corresponding aperture.

In some examples, each window includes a translucent base portion extending across the aperture, a transparent cover portion in the aperture overtop of the base portion, and informational content between the base portion and the cover portion, the informational content visible from an exterior of the housing when a corresponding display container is moved away from the predetermined location for providing information about the one or more articles containable in the display container.

In some examples, each cover portion is removable from the aperture for changing the informational content.

In some examples, the informational content is provided on a removable and generally transparent information sheet held between the base portion and the cover portion of the window.

In some examples, the panel portion of the platform is opaque.

In some examples, the interior light source comprises one or more light emitting diodes (LEDs) under the windows.

In some examples, the lighting system further includes an overtop light source positioned overtop the containers for illuminating the display containers from above.

In some examples, the display assembly further includes an interaction detection system including one or more sensors in the interior of the housing and coupled to the lighting system, the sensors operable to detect whether the predetermined locations have the display containers positioned thereat, and illumination of the windows via the one or more interior lights is controllable based on the sensors.

In some examples, the display assembly further includes a locking mechanism configurable between a locked configuration in which the platform is securely locked to the base to prevent detachment of the platform from the base, and an unlocked configuration in which the platform is unlocked from the base to permit detachment of the platform from the base for transporting the display containers and tethers away from the base.

According to some aspects, an illuminable display assembly includes: (a) a housing including a base securable to a support surface, a platform detachably mounted to the base, and a generally enclosed interior bounded by at least the platform, the platform including a plurality of illuminable windows spaced apart from each other therealong; (b) a plurality of retractable tethers mounted to the platform in the interior of the housing, the tethers for fastening corresponding display containers to the platform and urging the display containers to predetermined positions adjacent corresponding windows; and (c) a lighting system including one or more interior light sources in the interior of the housing for illuminating the windows.

According to some aspects, an illuminable display assembly includes: (a) a housing having a generally enclosed interior and at least one translucent portion having an interior surface extending over and facing the interior of the housing and an exterior surface opposite the interior surface; (b) at least one retractable tether mounted to the housing for fastening a corresponding display container to the housing, the tether configured to urge the display container to a predetermined position atop the exterior surface of the translucent portion of the housing; and (c) an integrated lighting system including at least one interior light source in the interior of the housing for illuminating the translucent portion from below.

In some examples, the lighting system includes at least one overtop light source positioned above and directed toward the predetermined position for illuminating the display container from above.

In some examples, the housing includes a base securable to a support surface and a platform detachably mounted to the base, the base and platform generally enclosing the interior of the housing, and the platform comprising the translucent portion.

In some examples, the translucent portion comprises a recessed window.

According to some aspects, an interactive display assembly includes: (a) a housing including a base securable to a support surface and a platform detachably mounted to the base, the base and platform defining a generally enclosed interior of the housing; (b) a plurality of display containers supported atop the platform at predetermined locations, at least a portion of each display container being generally transparent for viewing one or more articles containable therein for display; (c) one or more tether ports extending through the housing between the interior and an exterior of the housing; (d) a plurality of retractable tethers mounted to the platform in the interior of the housing, the tethers extending through the one or more tether ports and fastening corresponding display containers to the platform, and each tether permitting limited movement of a corresponding display container away from a corresponding predetermined location to facilitate viewing of the articles and urging the display container back to the predetermined location; and (e) an interaction detection system including one or more sensors in the interior of the housing, the one or more sensors operable to detect whether the predetermined locations have the display containers positioned thereat.

In some examples, the one or more sensors include a plurality of sensors positioned adjacent to corresponding predetermined locations, each sensor operable to detect whether a corresponding predetermined location has a corresponding display container positioned thereat.

In some examples, the sensors are supported by the base of the housing and the platform is detachable away from the base without the sensors.

In some examples, the sensors are mounted on a removable sensor panel supported in the interior of the housing.

In some examples, the detection system further includes a sensor hub in the interior of the housing under the sensor panel and connected to each sensor for communication therewith.

In some examples, the detection system includes a plurality of identification tags attached to corresponding display containers, and each sensor comprises a tag reader operable to sense proximity of a corresponding tag.

In some examples, the plurality of tethers are mounted to a tether panel in the interior of the housing adjacent the sensors and fixed to the platform.

In some examples, each predetermined location is defined by a seat for supporting a corresponding display container at the predetermined location.

In some examples, the platform has a top surface and each seat comprises a seat recess in the top surface of the platform for receiving a bottom portion of the display container, and wherein the one or more sensors are positioned under and adjacent the seat recesses.

In some examples, the display assembly includes a locking mechanism configurable between a locked configuration in which the platform is securely locked to the base to prevent detachment of the platform from the base, and an unlocked configuration in which the platform is unlocked from the base to permit detachment of the platform from the base for transporting the display containers and tethers away from the base.

According to some aspects, an interactive display assembly includes: (a) a housing including a base securable to a support surface, a platform detachably mounted to the base, and a generally enclosed interior bounded by at least the platform; (b) a plurality of retractable tethers mounted to the platform in the interior of the housing, the tethers for fastening corresponding display containers to the platform and urging the display containers to corresponding predetermined locations adjacent the platform; and (c) an interaction detection system including one or more sensors in the interior of the housing adjacent the predetermined locations, the one or more sensors operable to detect whether the predetermined locations have the display containers positioned thereat.

BRIEF DESCRIPTION OF THE DRAWINGS

The drawings included herewith are for illustrating various examples of apparatuses, articles, and methods of the present specification and are not intended to limit the scope of what is taught in any way. In the drawings:

FIG. 5 is a partially exploded perspective view from the front and bottom showing the platform portion detached from the base portion of the display assembly of FIG. 1;

FIG. 6 is a cross-sectional view of a display stand portion of the display assembly of FIG. 1, taken along line 6-6 in FIG. 2;

FIG. 17 is a perspective view from the top and front of another example display assembly;

FIG. 18 is a perspective view from the rear and top showing a platform portion detached from a base portion of the display assembly of FIG. 17;

FIG. 19 is a cross-sectional view of the display assembly of FIG. 17, taken along line 19-19 in FIG. 17;

FIG. 25 is another perspective view of portions of the display system of FIG. 20, showing optional lighting system components in the interior of the display assembly;

FIG. 26 is an enlarged view of a window of the display assembly of FIG. 22;

FIG. 26A is an enlarged view like that of FIG. 26, showing components of the window of FIG. 26 disassembled;

FIG. 29 is a perspective view of another example display system.

DETAILED DESCRIPTION

Various apparatuses, articles, or processes will be described below to provide an example of an embodiment of each claimed invention. No embodiment described below limits any claimed invention and any claimed invention may cover apparatuses, articles, or processes that differ from those described below. The claimed inventions are not limited to apparatuses, articles, or processes having all of the features of any one apparatus, article, or process described below or to features common to multiple or all of the apparatuses, articles, or processes described below. It is possible that an apparatus, article, or process described below is not an embodiment of any claimed invention. Any invention disclosed in an apparatus, article, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

In retail or other environments, it may be desirable or necessary to display articles for sale in secure display containers. The containers can be locked and tamper-proof to prevent patrons from touching the articles being displayed therein. The containers may also be fastened to a secure surface at a display location through, for example, a tether to allow patrons to handle and manipulate the display containers for viewing and/or sampling an aroma of the articles contained therein while deterring theft or misplacement of the containers.

The present application discloses examples of display assemblies for securely displaying articles in secure display containers fastened at a display location. The display assemblies can be portable and allow for convenient detachment and reattachment of the display containers for transport away from and back to the display (or other) location. This can facilitate, for example, servicing, replacement, and/or more secure storage (e.g. during store closure, overnight, etc.) of the display containers and/or articles contained therein. The articles can include, for example, aromatic botanical specimens such as, for example, cannabis specimens.

According to some aspects of the present disclosure, the display assemblies can be illuminable to facilitate presentation and display of the display containers and/or viewing of the articles and/or informational content regarding the articles, and in some examples, may be capable of detecting interaction with the display containers to facilitate, for example, dynamic lighting, visuals, and/or display of informational content about the articles being displayed and/or interacted with. According to some aspects, the display assembly can be generally portable to facilitate sale, shipping, and installation while including integrated illumination and/or interactivity components.

Figure 1:
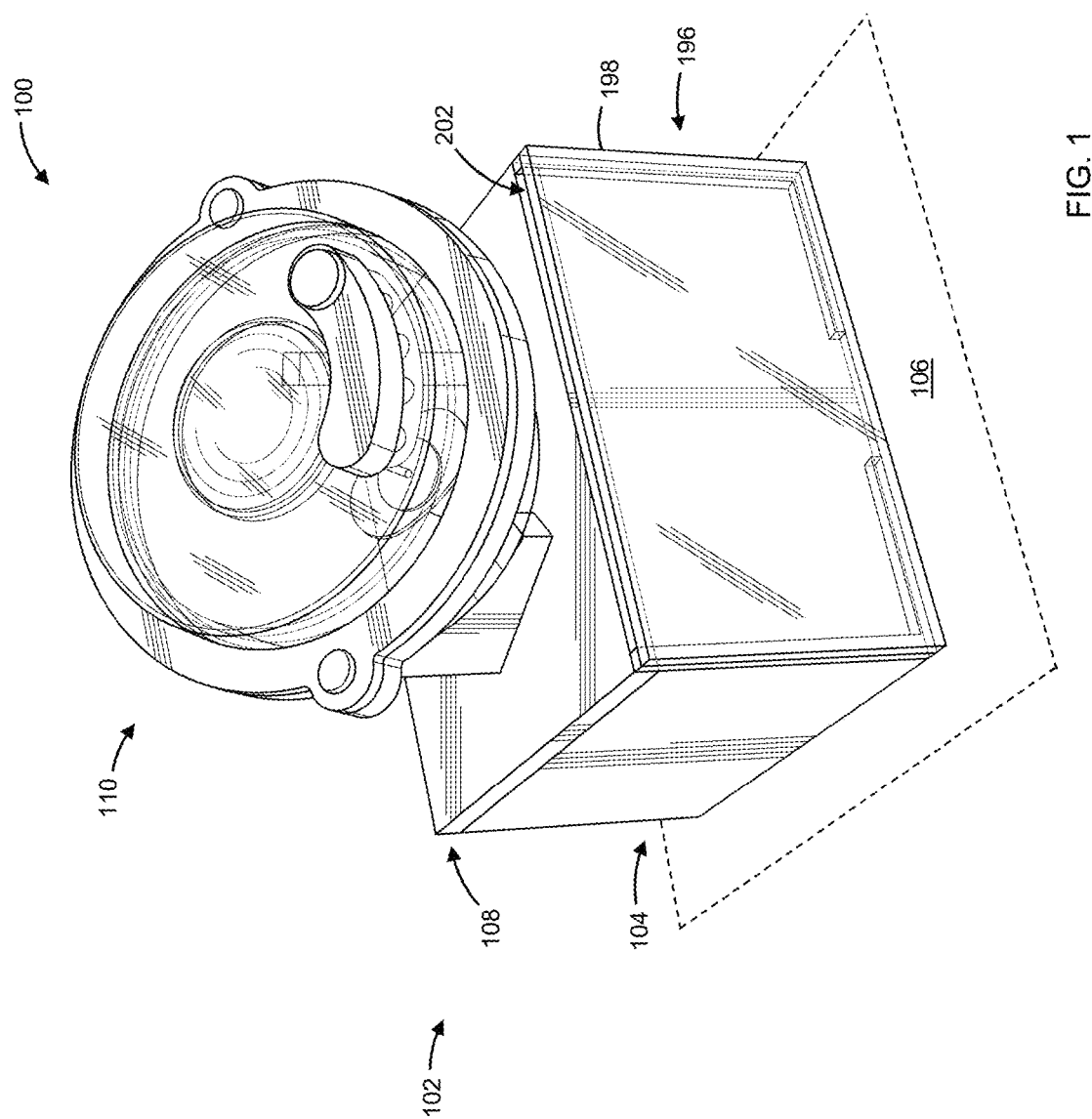
FIG. 1 is a perspective view from the front and top of an example display assembly.

Referring to FIG. 1, an example display assembly 100 for secure display of one or more articles is illustrated. In the example illustrated, the display assembly 100 includes a display stand 102 (in the form of a housing 102) having a first portion (in the form of a base 104 in the example illustrated) securable to a secure support surface 106 (shown schematically in FIG. 1) and a second portion (in the form of a platform 108 in the example illustrated) detachably mounted to the base 104. The support surface 106 can comprise a permanent and/or semi-permanent fixture or structure such as, for example, a counter, table, wall, shelf, and/or other construction (e.g. hanging or free standing brackets and/or frames) to which the display assembly 100 can be securely mounted to inhibit removal of the display assembly 100 from the premises while on display.

Still referring to FIG. 1, in the example illustrated, the display assembly 100 further includes at least one display container 110 adjacent the display stand 102. In the example illustrated, the display container 110 is supported atop and fastened to the platform 108. The display container 110 has a generally enclosed container interior 112 (FIG. 8) for containing one or more articles 50 (shown schematically in FIG. 8) for display, and in the example illustrated, is locked and tamper-proof to prevent patrons from touching the articles 50 being displayed therein. At least a portion of the container 110 is generally transparent to allow for viewing of the articles 50 contained therein.

Referring to FIG. 5, in the example illustrated, the display assembly 100 further includes a locking mechanism 114 mounted to the display stand 102. The locking mechanism is moveable between a locked position (shown in FIG. 6 in solid lines) and an unlocked position (shown in FIG. 6 in dashed lines). When the locking mechanism 114 is in the locked position, the platform 108 is securely locked to the base 104 to prevent detachment of the platform 108 from the base 104, which can help prevent removal of the display containers fastened to the platform from the premises. When the locking mechanism 114 is in the unlocked position, the platform 108 is unlocked from the base 104 to permit detachment of the platform 108 from the base 104 for transporting the platform 108 and the display container 110 fastened to the platform 108 away from the base 104. This can allow for the display container 110 to be securely displayed at a predetermined display location where the base 104 is mounted, and for convenient detachment and reattachment of the platform 108 and display container 110 for transport away from and back to the display location, which can facilitate servicing, replacement, and/or more secure storage (e.g. during store closure, overnight, etc.) of the display container 110 and articles 50 contained therein.

Figure 4:
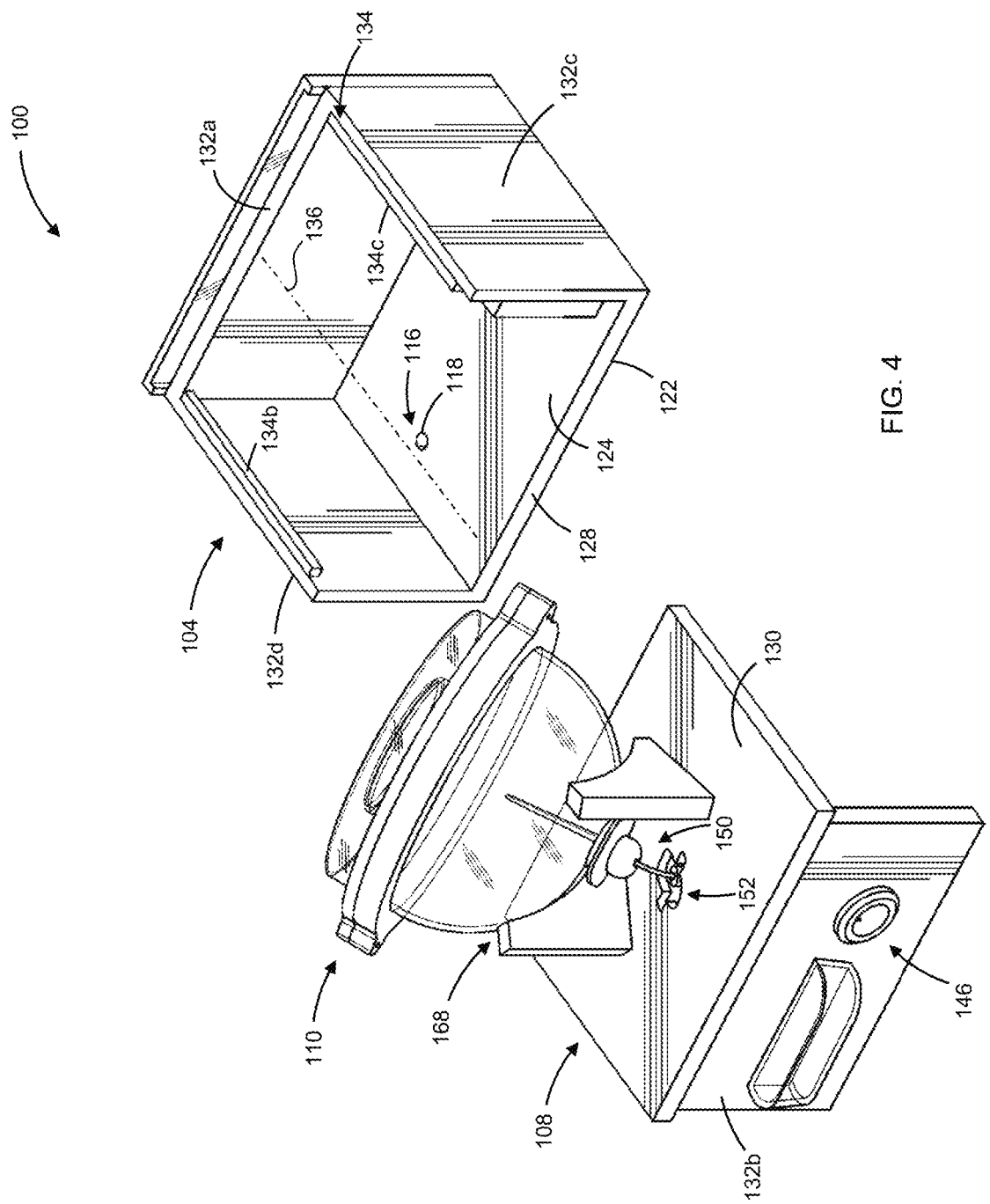
FIG. 4 is a partially exploded perspective view from the rear and top showing a platform portion detached from a base portion of the display assembly of FIG. 1.

Referring to FIG. 4, in the example illustrated, the base 104 includes one or more mounting features 116 for securing the base 104 to the support surface 106. The mounting features 116 are generally inaccessible by patrons when the base 104 is secured to the support surface 106 and the platform 108 is mounted to the base 104 (see e.g. FIG. 1). The mounting features 116 are accessible when the platform 108 is detached from the base. This can help inhibit tampering of the mounting features 116 by blocking access to the mounting features 116 when the platform 108 (and display container 110) is locked to the base 104, and by providing access to the mounting features 116 only when the platform 108 is unlocked and (at least partially) removed from the base 104.

In the example illustrated, the mounting features 116 include a plurality of mounting holes 118 for receiving fasteners 120 (e.g. screws or bolts; shown schematically in FIG. 6) to secure the base 104 to the support surface 106 (FIG. 1). In the example illustrated, the mounting holes 118 extend through the base 104 between an underside surface 122 of the base 104 positionable over the support surface 106 and a topside surface 124 of the base 104 opposite the underside surface 122. In the example illustrated, the topside surface 124 of the base 104 and the holes 118 are covered by the platform 108 when the platform 108 is mounted to the base 104, and the topside surface 124 and the holes 118 (and fasteners 120 when the base 104 is secured to the support surface 106) are exposed when the platform 108 is detached from the base 104.

Referring to FIG. 6, in the example illustrated, the display stand 102 (in the form of housing 102) having a generally enclosed housing interior 126 bounded by the base 104 and the platform 108. In the example illustrated, the display stand 102 has a bottom wall 128 at a bottom of the display stand 102 and bounding the interior 126 from below, a top wall 130 vertically opposite the bottom wall 128 at a top of the display stand 102 and bounding the interior 126 from above, and a sidewall 132 extending vertically between the bottom and top walls 128, 130 and bounding the interior 126 horizontally. Referring to FIGS. 4 and 5, in the example illustrated, the sidewall 132 includes a sidewall front portion 132a at a front of the display stand 102, a sidewall rear portion 132b axially opposite the sidewall front portion 132a and at a rear of the display stand 102, a sidewall left portion 132c extending between the sidewall front and rear portions 132a, 132b on a left side of the display stand 102, and a sidewall right portion 132d extending between the sidewall front and rear portions 132a, 132b on a right side of the display stand laterally opposite the left side. In the example illustrated, the base 104 comprises the bottom wall 128, sidewall front portion 132a, sidewall left portion 132c, and sidewall right portion 132d, and the platform 108 comprises the top wall 130 and the sidewall rear portion 132b. In the example illustrated, the mounting holes 118 extend through the bottom wall 128 of the base 104 and are open to the interior 126.

Referring to FIG. 4, in the example illustrated, the base 104 includes a track 134 extending along a track axis 136, and the platform 108 is slidably mounted on the track 134. Referring to FIG. 5, in the example illustrated, the platform 108 includes one or more track engagement surfaces 138 for interlocking with the track 134 to constrain movement of the platform 108 to along the track axis 136 (and inhibit movement of the platform 108 in a direction transverse to the track axis 136) when the platform 108 is slidably mounted on the track 134. In the example illustrated, the track 134 (and track axis 136) extends axially between the front and rear of the display stand 102. Referring to FIG. 6, in the example illustrated, the track 134 includes a first guide surface 134a fixed relative to the sidewall left portion 132c and a second guide surface 134b fixed relative to the sidewall right portion 132d. In the example illustrated, each guide surface 134a, 134b comprises a rail extending along the track axis 136 and projecting laterally into the interior 126 of the display stand 102. In the example illustrated, each track engagement surface 138 defines a groove slidable over a respective rail and is fixed relative to the top wall 130 of the platform 108.

In the example illustrated, when the platform 108 is mounted to the base 104 and the locking mechanism 114 is in the locked position, the track 134 prevents movement of the platform 108 in the direction transverse to the track axis 136 and the locking mechanism 114 prevents movement of the platform 108 along the track axis 136. When the locking mechanism 114 is in the unlocked position, the platform 108 is movable along the track axis 136 for detachment from the base 104.

Referring to FIG. 6, in the example illustrated, the locking mechanism 114 includes a latch 140 movably mounted to one of the base 104 and the platform 108, and a strike surface 142 fixed relative to the other one of the base 104 and the platform 108. The latch 140 is positioned for engagement with the strike surface 142 when the platform 108 is mounted to the base 104 and the locking mechanism 114 is in the locked position, to prevent detachment of the platform 108 from the base 104. The latch 140 is clear of the strike surface 142 when the locking mechanism 114 is in the unlocked position to permit the platform 108 to be mounted to and detached from the base 104. In the example illustrated, the latch 140 is mounted to the platform 108 and the strike surface 142 is fixed relative to the base 104. In the example illustrated, the strike surface 142 comprises a strike plate 144 fixed to the sidewall 132 and projecting laterally into the interior 126 of the display stand 102. Referring to FIG. 4, in the example illustrated, the locking mechanism 114 includes a key slot 146 for receiving a key to move the locking mechanism 114 (in particular, the latch 140 in the example illustrated) between the locked and unlocked positions. In the example illustrated, the latch 140 and key slot 146 are mounted to the sidewall rear portion 132b. The key slot 146 is accessible from the rear of the display assembly 100, and the latch 140 is in the interior 126 when the platform 108 is mounted to the base 104.

Figure 2:
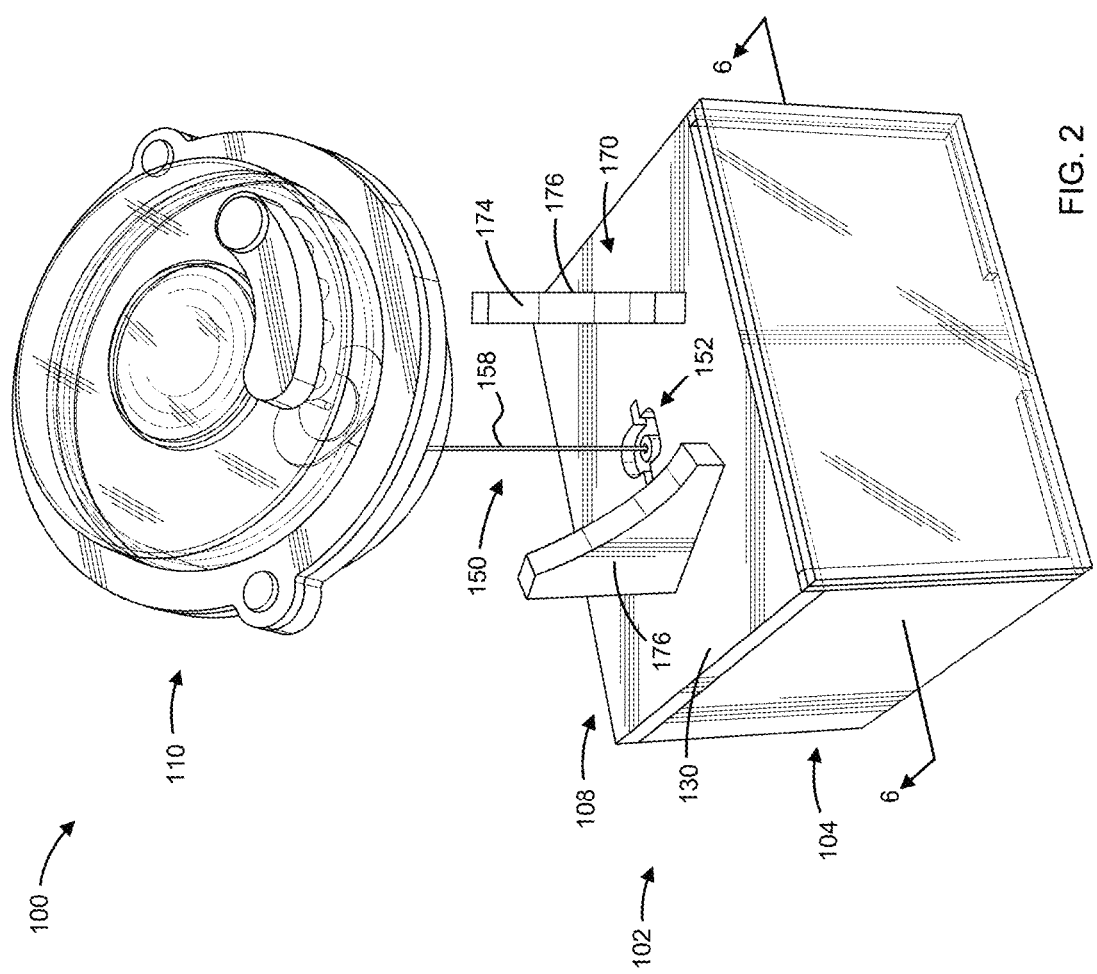
FIG. 2 is a perspective view like that of FIG. 1, but with a display container shown raised above a platform portion of the display assembly of FIG. 1.

Referring to FIG. 2, in the example illustrated, the display assembly 100 further includes at least one retractable security tether 150 securely fastening the display container 110 to the platform 108. The retractable tether 150 permits limited movement of the display container 110 away from the platform 108 to facilitate closer and/or more comfortable inspection and/or aroma sampling of the articles 50 therein, and urges the display container 110 back to the platform 108. In the example illustrated, the retractable tether 150 holds the display container 110 adjacent the platform 108.

In the example illustrated, the display assembly 100 includes at least one tether port 152 extending between the interior 126 and an exterior of the display stand 102. In the example illustrated, the retractable tether 150 is mounted to the platform 108 in the interior 126 (FIG. 6) and extends through the tether port 152 to the display container 110. In the example illustrated, the tether port 152 passes through the top wall 130 of the platform 108.

Referring to FIG. 6, in the example illustrated, the retractable tether 150 comprises a retraction mechanism 156 mounted in the interior 126 and a tether line 158 (in the form of a cable, in the example illustrated—see FIG. 2) extending through the tether port 152 between a proximal end coupled to the retraction mechanism 156 and a distal end secured to the display container 110. The distal end can be secured to the display container 110 through, for example, a loop and fastener connection, adhesive, and/or in any other suitable manner.

Referring to FIG. 2, in the example illustrated, the tether line 158 is extendible from the retraction mechanism 156 to accommodate movement of the display container 110 away from the platform 108, and the retraction mechanism 156 urges retraction of the tether line 158 back into the retraction mechanism 156 for returning the display container 110 back to the platform 108. Referring to FIG. 6, in the example illustrated, the retraction mechanism 156 includes a casing 160 mounted in the interior 126 to an inner surface of the platform 108, a spring-loaded reel in the casing 160 and around which the tether line 158 is wound for urging retraction of the tether line 158 into the casing 160, and a casing opening through which the tether line 158 extends from within the casing 160. In the example illustrated, the retractable tether 150 is mounted to an underside of the platform 108, and the casing opening is in alignment with the tether port 152.

Figure 8:
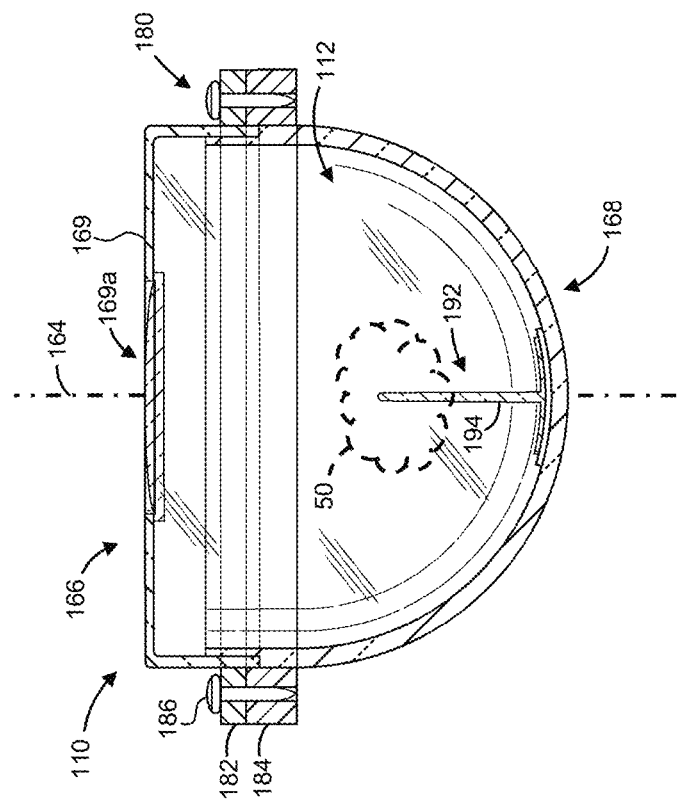
FIG. 8 is a cross-sectional view of the display container of FIG. 7, taken along line 8-8 in FIG. 7.

Referring to FIG. 8, in the example illustrated, the display container 110 extends along a container axis 164 between a top portion 166 and a bottom portion 168 vertically opposite the top portion. The top and bottom portions 166, 168 generally enclose the interior 112 of the container 110. In the example illustrated, the top portion 166 comprises a generally transparent viewing surface 169 normal to the container axis 164 and through which articles 50 in the container 110 can be viewed. In the example illustrated, the viewing surface 169 comprises a viewing lens 169a for viewing the articles 50 in the display container 110. In the example illustrated, the bottom portion 168 is also generally transparent.

Figure 3:
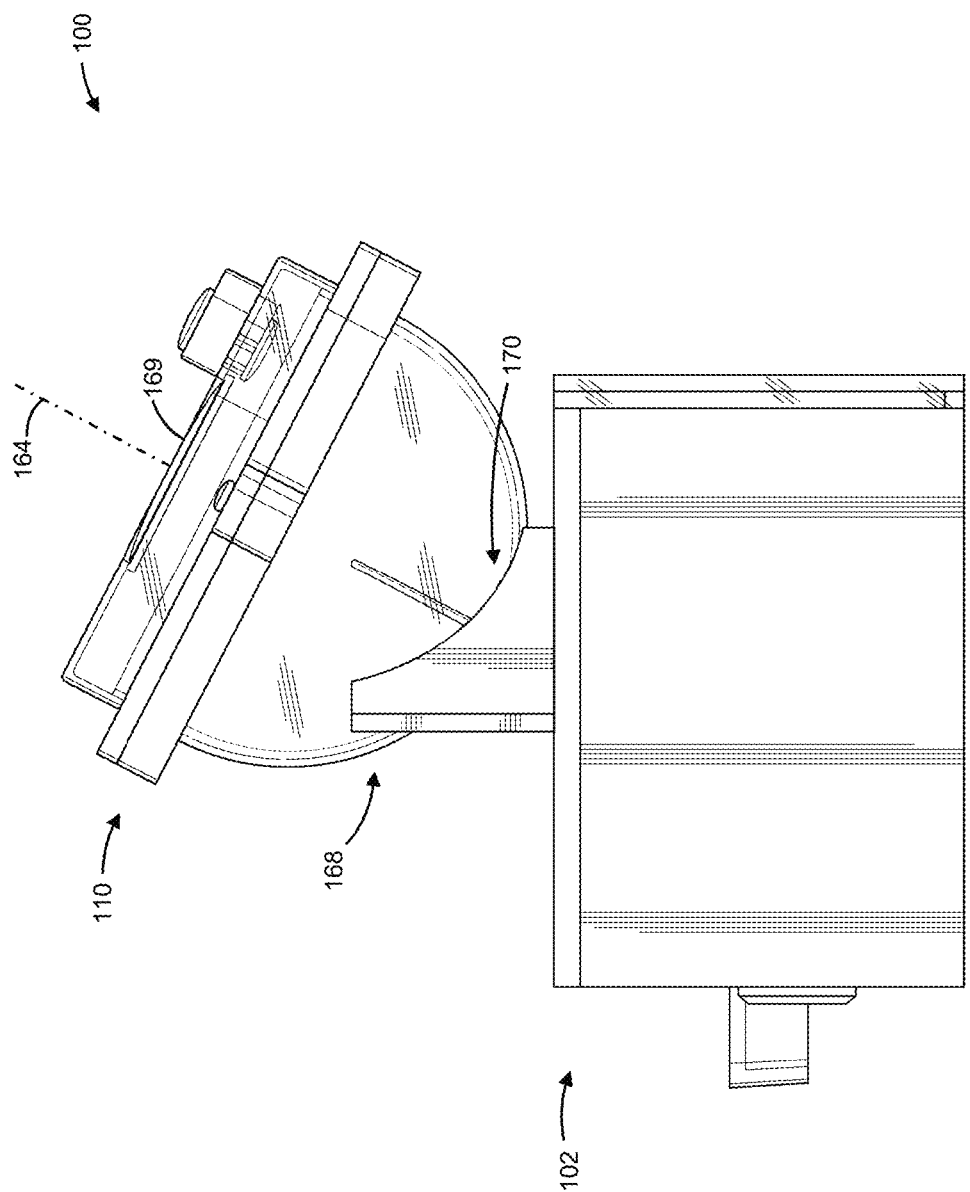
FIG. 3 is a side elevation view of the display assembly of FIG. 1.

Referring to FIG. 3, in the example illustrated, the platform 108 includes at least one seat 170 shaped for supporting the bottom portion 168 of the display container 110. In the example illustrated, when the display container 110 is in the seat 170, the seat 170 and the retractable tether 150 cooperate to hold the display container 110 at an angled orientation, in which the viewing surface 169 is inclined from horizontal toward the front of the display stand 102 (and in which the container axis 164 is oriented at an oblique angle from vertical). This can help orient the viewing surface 169 toward patrons when the display container 110 is in the seat 170 to facilitate presentation, display, and/or inspection of the articles 50.

Referring to FIG. 2, in the example illustrated, the seat 170 comprises a seating surface 174 for engagement with the bottom portion 168 of the display container 110 when in the seat 170. Referring to FIG. 4, in the example illustrated, the tether 150 is fastened to a bottom end at the bottom portion 168 of the display container 110 adjacent the container axis 164, and the tether port 152 is positioned generally rearward of and at an elevation below the seating surface 174 so that the tether 150 pulls the bottom portion 168 downwardly and rearwardly into the seat 170 and urges the display container 110 into the angled orientation.

In the example illustrated, the bottom portion 168 of the display container 110 has a generally hemispherical shape, and the seat 170 has an arcuate curvature corresponding to the hemispherical shape. Referring to FIG. 2, in the example illustrated, the seat 170 projects upwardly from the top wall 130 of the platform 108. In the example illustrated, the seat 170 comprises a pair of laterally spaced apart support members 176 projecting upwardly from the top wall 130. In the example illustrated, the tether port 152 is laterally intermediate the support members 176.

Referring to FIG. 8, in the example illustrated, the top portion 166 of the container 110 comprises a lid 178 and is detachably locked to the bottom portion 168 of the container 110. In the example illustrated, the container 110 includes a locking ring 180 for detachably locking the top portion 166 to the bottom portion 168. In the example illustrated, the locking ring 180 includes a ring first portion 182 fixed relative to the top portion 166 of the container 110 (through an adhesive, for example) and a ring second portion 184 fixed relative to the bottom portion 168 of the container 110. In the example illustrated, the ring first portion 182 is locked to the ring second portion 184 with one or more removable fasteners 186 (e.g. screws) to inhibit tampering and/or unauthorized opening of the display container 110. The fasteners 186 can be removed to detach the top portion 166 of the container 110 from the bottom portion 168 for opening the display container 110 to insert or remove the article 50 from the interior 112 of the display container 110.

Figure 7:
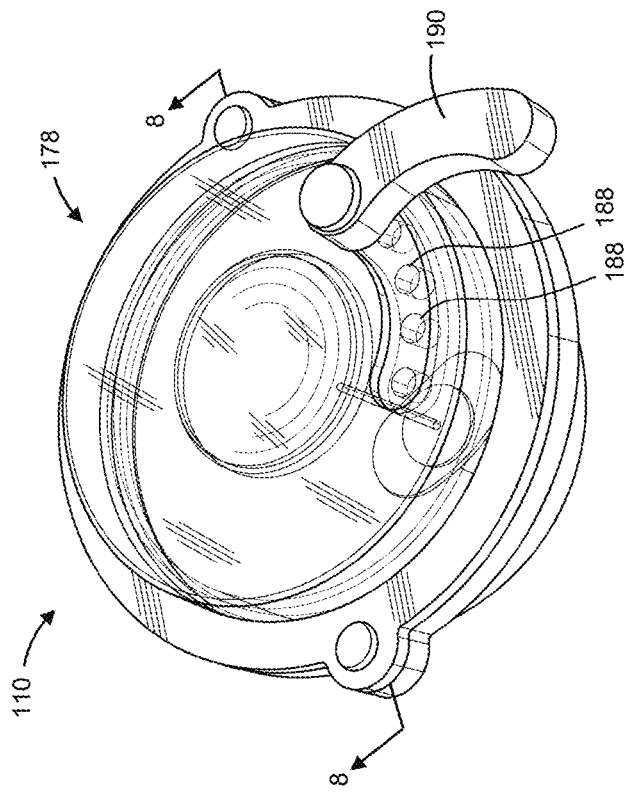
FIG. 7 is a perspective view of a display container of the display assembly of FIG. 1, with a plug portion of the container in an open position.

Referring to FIG. 7, in the example illustrated, the display container 110 includes a plurality of scent ports 188 extending between the interior 112 of the display container and environment, and a plug 190 sealing the scent ports 188. The plug 190 is movable away from the scent ports 188 to expose the scent ports 188 and facilitate sampling of an aroma of the articles 50 in the display container 110. In the example illustrated, the scent ports 188 are in the lid 178 of the display container 110, and the plug 190 is movably mounted to the lid 178.

Referring to FIG. 8, in the example illustrated, the display container 110 further includes a retainer 192 in the container interior 112 of the display container 110 for retaining the article 50 at a predetermined location in the container interior 112. In the example illustrated, the retainer 192 includes an elongate mounting projection 194. In the example illustrated, the mounting projection 194 is generally coaxial with the container axis 164. In the example illustrated, the elongate mounting projection comprises a spike for piercing the article 50.

Referring to FIG. 1, in the example illustrated, the display assembly 100 further includes an information display system 196 supported by the display stand 102 adjacent the display container 110 for displaying information about the articles in the display container 110. In the example illustrated, the display system 196 is mounted to the base 104. In the example illustrated, the information display system 196 includes at least one card holder 198 shaped to receive and hold an information card providing the information about the articles 50. In the example illustrated, the card holder 198 comprises a transparent wall defining a card slot 202 for receiving and holding the information card.

Figure 9:
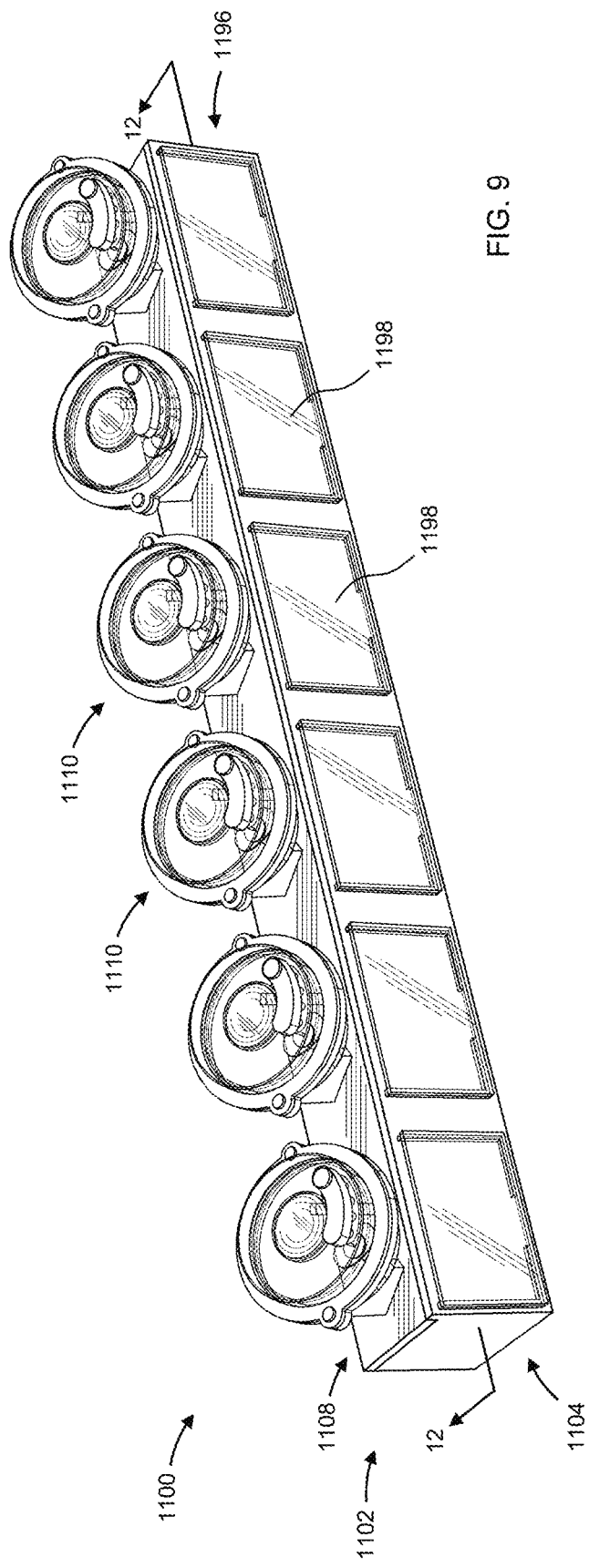
FIG. 9 is a perspective view from the top and front of another example display assembly.

Referring to FIG. 9, another example display assembly 1100 is illustrated. The display assembly 1100 has similarities to the display assembly 100, and like features are identified using like reference characters, incremented by 1000.

Figure 10:
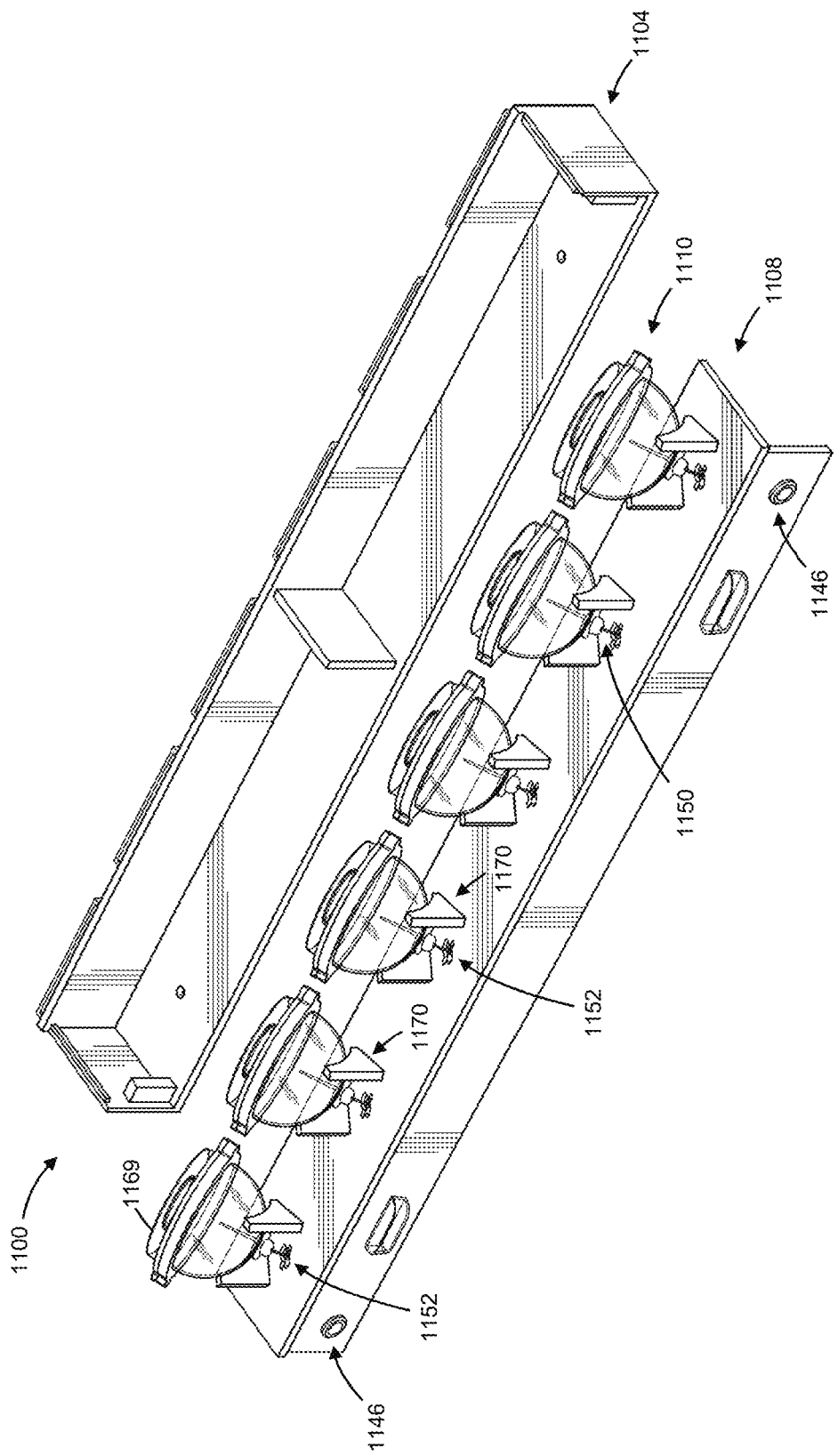
FIG. 10 is a perspective view from the rear and top showing a platform portion detached from a base portion of the display assembly of FIG. 9.
Figure 11:
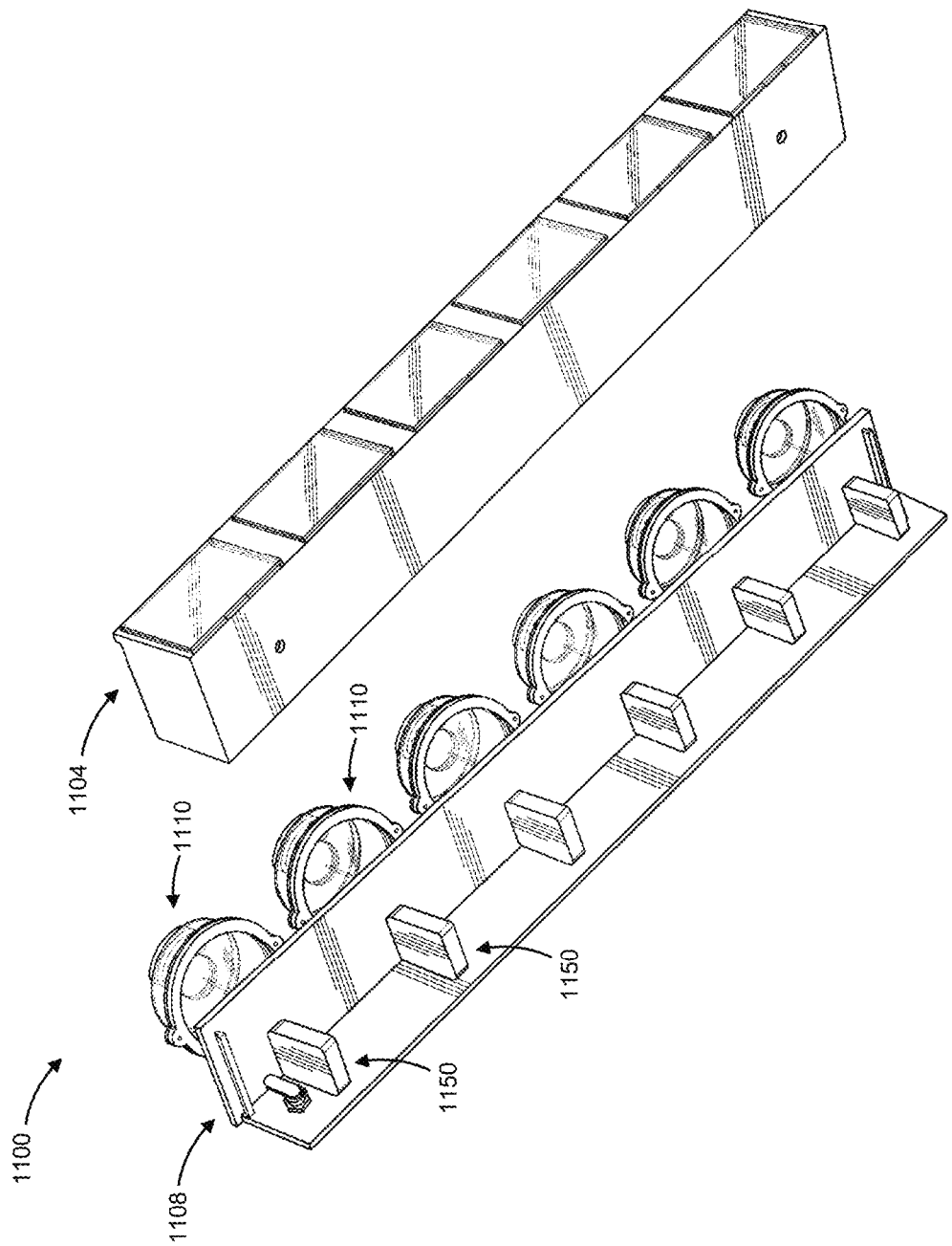
FIG. 11 is a perspective view from the front and bottom showing the platform portion detached from the base portion of the display assembly of FIG. 9.

In the example illustrated, the display assembly 1100 includes a display stand 1102 having a base 1104 securable to a secure support surface and a platform 1108 detachably mounted to the base 1104. In the example illustrated, a plurality of display containers 1110 are supported atop and fastened to the platform 1108. Referring to FIG. 11, in the example illustrated, a plurality of retractable security tethers 1150 are mounted to the platform 1108. Each tether 1150 securely fastens a corresponding display container 1110 to the platform 1108. Referring to FIG. 10, in the example illustrated, the display assembly 1100 includes a plurality of tether ports 1152 extending between an interior and an exterior of the display stand 1102. In the example illustrated, the retractable tethers 1150 are mounted to the platform 1108 in the interior and each tether 1150 extends through a corresponding tether port 1152 to a corresponding display container 1110.

Referring to FIG. 10, in the example illustrated, the platform 1108 includes a plurality of seats 1170, each seat 1170 shaped for supporting a corresponding display container 1110. In the example illustrated, when the display container 1110 is in the seat 1170, the seat 1170 and the retractable tether 1150 cooperate to hold the display container 1110 at an angled orientation, in which a transparent viewing surface 1169 of the display container 1110 is inclined from horizontal toward the front of the display stand 1102 (to angle the viewing surface 1169 toward patrons when the container is in the seat 1170).

Figure 12:
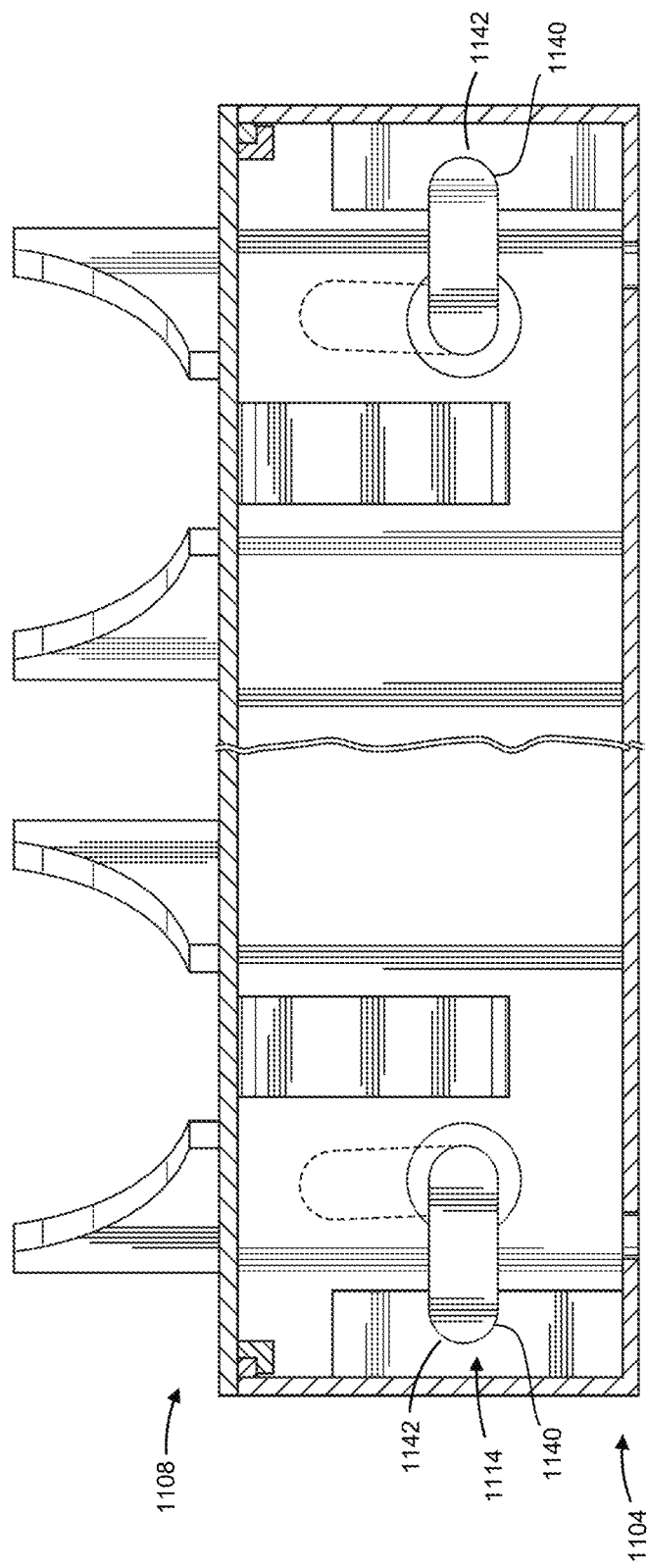
FIG. 12 is a cross-sectional view of a display stand portion of the display assembly of FIG. 9, taken along line 12-12 in FIG. 9.

Referring to FIG. 12, in the example illustrated, a locking mechanism 1114 is mounted to the display stand 1102, and movable between a locked position and an unlocked position. When the locking mechanism 1114 is in the locked position, the platform 1108 is securely locked to the base 1104. When the locking mechanism 1114 is in the unlocked position, the platform 1108 is unlocked from the base 1104 to permit detachment of the platform from the base for transporting the platform 1108 and the plurality of display containers 1110 fastened to the platform 1108 away from the base 1104.

In the example illustrated, the locking mechanism 1114 includes a pair of laterally spaced apart latches 1140 movably mounted to the platform 1108, and a pair of laterally spaced apart corresponding strike surfaces 1142 fixed relative to the base 1104. The strike surfaces 1142 are positioned for engagement by the latches 1140 when the platform 1108 is mounted to the base 1104 and the locking mechanism 1114 is in the locked position, to prevent detachment of the platform 1108 from the base 1104. The latches 1140 are clear of the strike surfaces 1142 when the locking mechanism 1114 is in the unlocked position to permit the platform 1108 to be mounted to and detached from the base 1104. Referring to FIG. 10, in the example illustrated, the locking mechanism 1114 includes a pair of key slots 1146, each key slot 1146 for actuating a corresponding latch 1140 independently.

Referring to FIG. 9, in the example illustrated, the display assembly 1100 further includes an information display system 1196 supported by the display stand 1102 adjacent the display containers 1110 for displaying information about the articles 50 containable in the display containers 1110. In the example illustrated, the information display system 1196 includes a plurality of card holders 1198. Each card holder 1198 is adjacent a corresponding display container 1110 and is shaped to receive and hold an information card providing information about articles 50 containable in that display container 1110. In the example illustrated, the card holders 1198 are supported by the display stand 1102 in front of and at an elevation below the display containers 1110.

Figure 13:
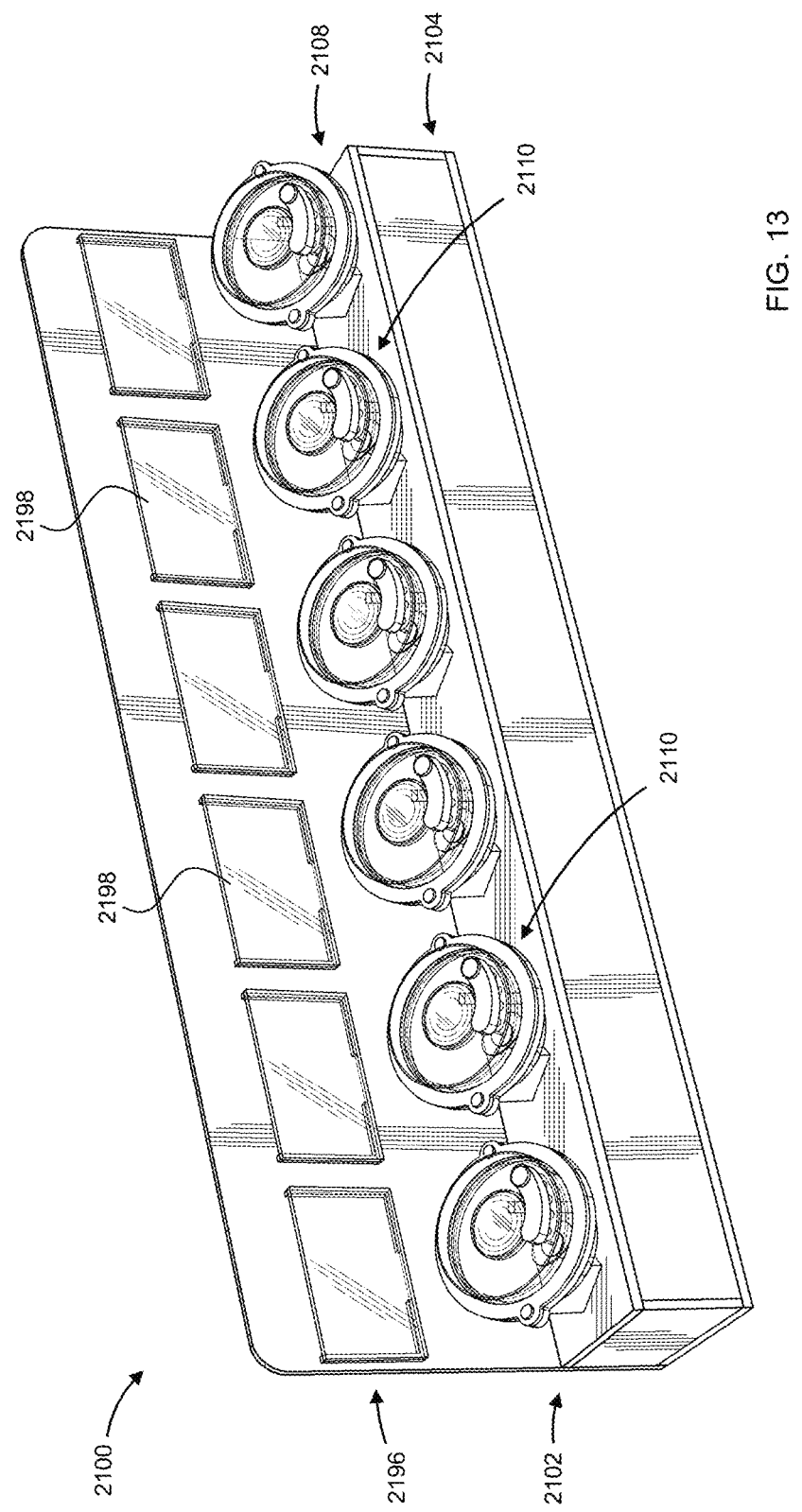
FIG. 13 is a perspective view from the top and front of another example display assembly.

Referring to FIG. 13, another example display assembly 2100 is illustrated. The display assembly 2100 has similarities to the display assembly 1100, and like features are identified using like reference characters, incremented by 1000.

In the example illustrated, the display assembly 2100 includes a display stand 2102 having a base 2104 securable to a secure support surface and a platform 2108 detachably mounted to the base 2104. A plurality of display containers 2110 are supported atop and fastened to the platform 2108 through corresponding tethers (e.g. similar to tethers 1150) mounted to the platform 2108. In the example illustrated, the display assembly 2100 further includes an information display system 2196 supported by the display stand 2102 adjacent the display containers 2110 for displaying information about the articles 50 containable in the display containers 2110. In the example illustrated, the information display system 2196 includes a plurality of card holders 2198, each card holder 2198 for receiving a corresponding information card. In the example illustrated, the card holders 2198 are supported by the display stand 2102 behind and at an elevation above the display containers 2110.

Figure 14:
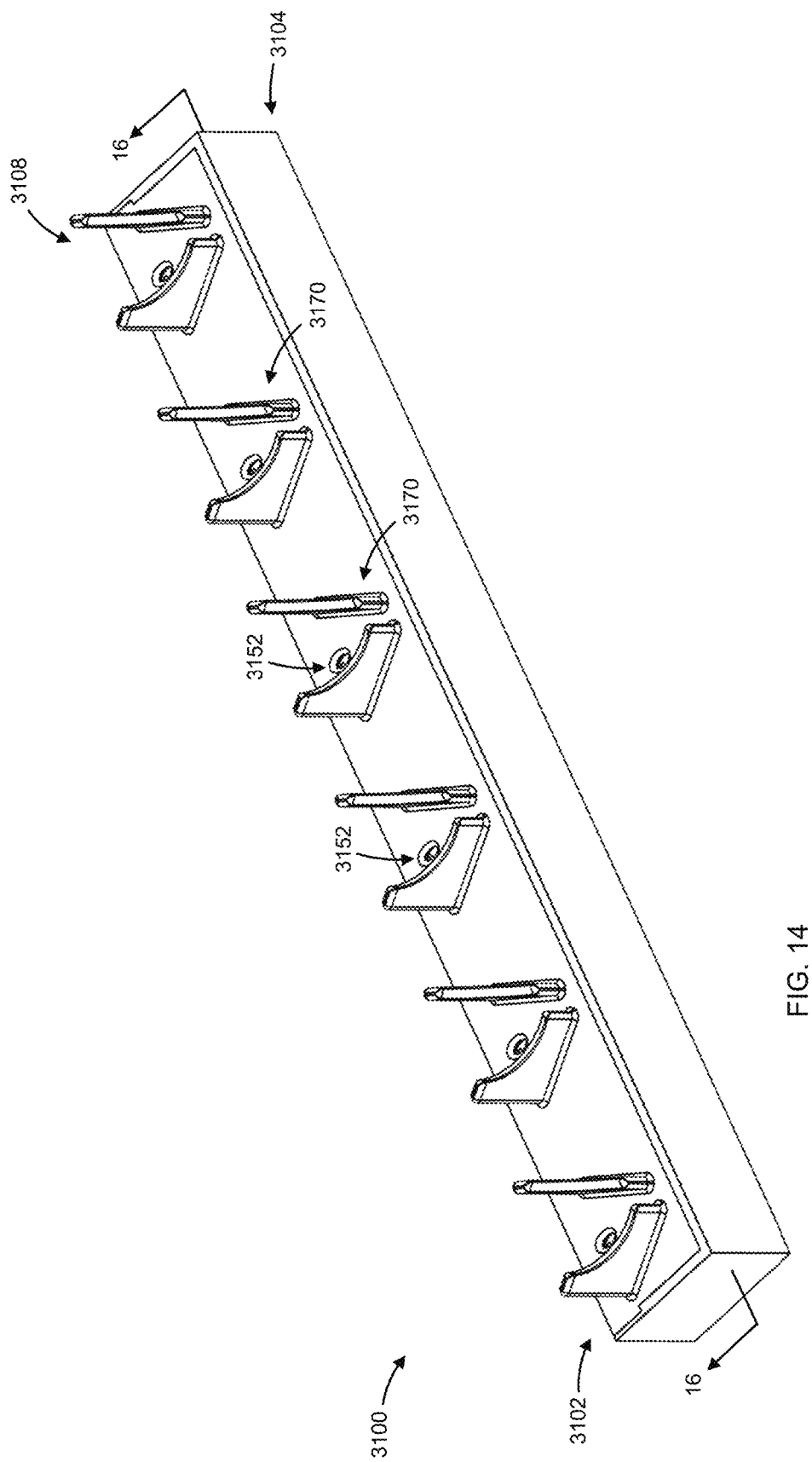
FIG. 14 is a perspective view from the top and front of another example display assembly.

Referring to FIG. 14, another example display assembly 3100 is illustrated. The display assembly 3100 has similarities to the display assembly 100, and like features are identified using like reference characters, incremented by 3000.

Figure 16:
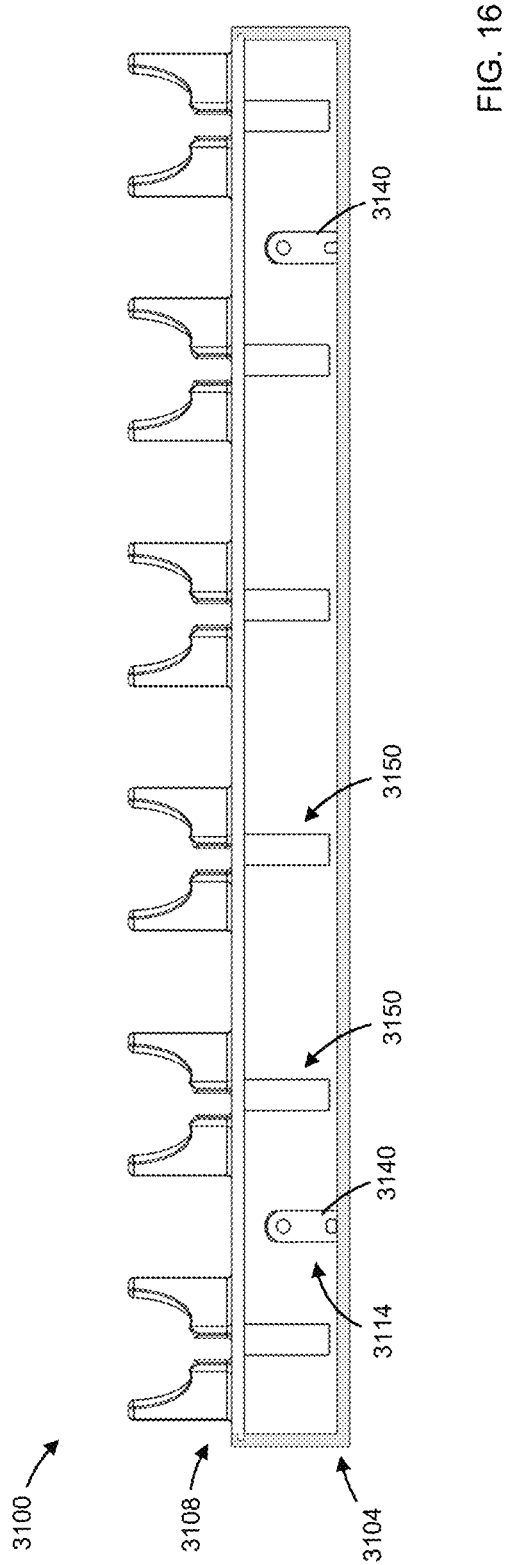
FIG. 16 is a cross-sectional view of the display assembly of FIG. 14, taken along line 16-16 in FIG. 14.

The display assembly 3100 includes a display stand 3102 having a base 3104 securable to a secure support surface and a platform 3108 detachably mounted to the base 3104. Referring to FIG. 16, in the example illustrated, a plurality of retractable security tethers 3150 are mounted to the platform 3108. Each tether 3150 is for securely fastening a corresponding display container (like the container 110) to the platform 3108. Referring to FIG. 14, in the example illustrated, the display assembly 3100 includes a plurality of tether ports 3152 extending between an interior and an exterior of the display stand 3102. In the example illustrated, the retractable tethers 3150 are mounted to the platform 3108 in the interior and each tether 3150 is extendable through a corresponding tether port 3152 to a corresponding display container. In the example illustrated, the platform 3108 includes a plurality of seats 3170, each seat 3170 shaped for supporting a corresponding display container at an angled orientation (e.g. similar to that shown in FIG. 1 for the display container 110).

Referring to FIG. 16, in the example illustrated, a locking mechanism 3114 is mounted to the display stand 3102. The locking mechanism 3114 is moveable between a locked position and an unlocked position. When the locking mechanism 3114 is in the locked position, the platform 3108 is securely locked to the base 3104. When the locking mechanism 3114 is in the unlocked position, the platform 3108 is unlocked from the base 3104 to permit detachment of the platform 3108 from the base for transporting the platform 3108 and the plurality of the display containers fastened to the platform 3108 away from the base 3104.

Figure 15:
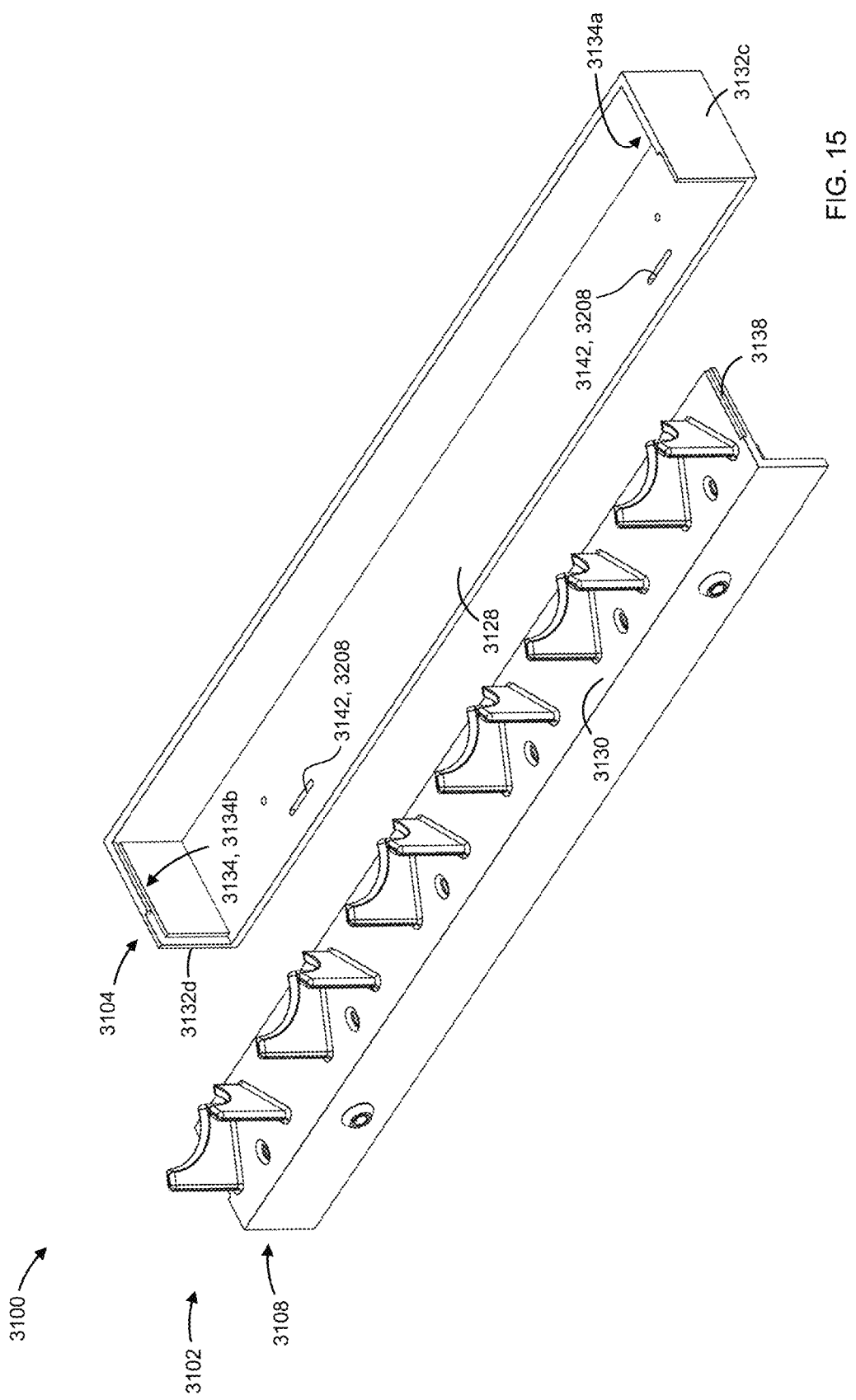
FIG. 15 is a perspective view from the rear and top showing a platform portion detached from a base portion of the display assembly of FIG. 14.

In the example illustrated, the locking mechanism 3114 includes a pair of laterally spaced apart latches 3140 and a pair of corresponding strike surfaces 3142 fixed relative to the base 3104 for engagement by the latches 3140. In the example illustrated, the latches 3140 are mounted to the platform 3108. Referring to FIG. 15, in the example illustrated, each strike surface 3142 is defined by a corresponding opening 3208 in a bottom wall 3128 of the base 3104 for receiving a corresponding latch 3140.

Referring to FIG. 15, in the example illustrated, the base 3104 includes a track 3134 and the platform 3108 is slidably mounted on the track 3134. In the example illustrated, the platform 3108 includes one or more track engagement surfaces 3138 for interlocking with the track 3134 to constrain movement of the platform 3108 to along the track 3134. In the example illustrated, the track 3134 includes a first guide surface 3134a fixed relative to a sidewall left portion 3132c and a second guide surface 3134b fixed relative to a sidewall right portion 3132d of the base 3102. In the example illustrated, each guide surface 3134a, 3134b comprises a groove in an inner surface of the base 3104. In the example illustrated, each track engagement surface 3138 defines a ridge fixed relative to the top wall 3130 of the platform 3108 and slidable into a corresponding groove.

Referring to FIGS. 17 to 19, another example display assembly 4100 is illustrated. The display assembly 4100 has similarities to the display assembly 3100, and like features are identified using like reference characters, incremented by 1000. The display assembly 4100 includes a display stand 4102 having a base 4104 securable to a secure support surface and a platform 4108 detachably mounted to the base 4104. In the example illustrated, a single retractable security tether 4150 is mounted to the platform 4108 (in an interior of the display stand) for securely fastening a single display container (like the container 110) to the platform 4108.

Figure 20:
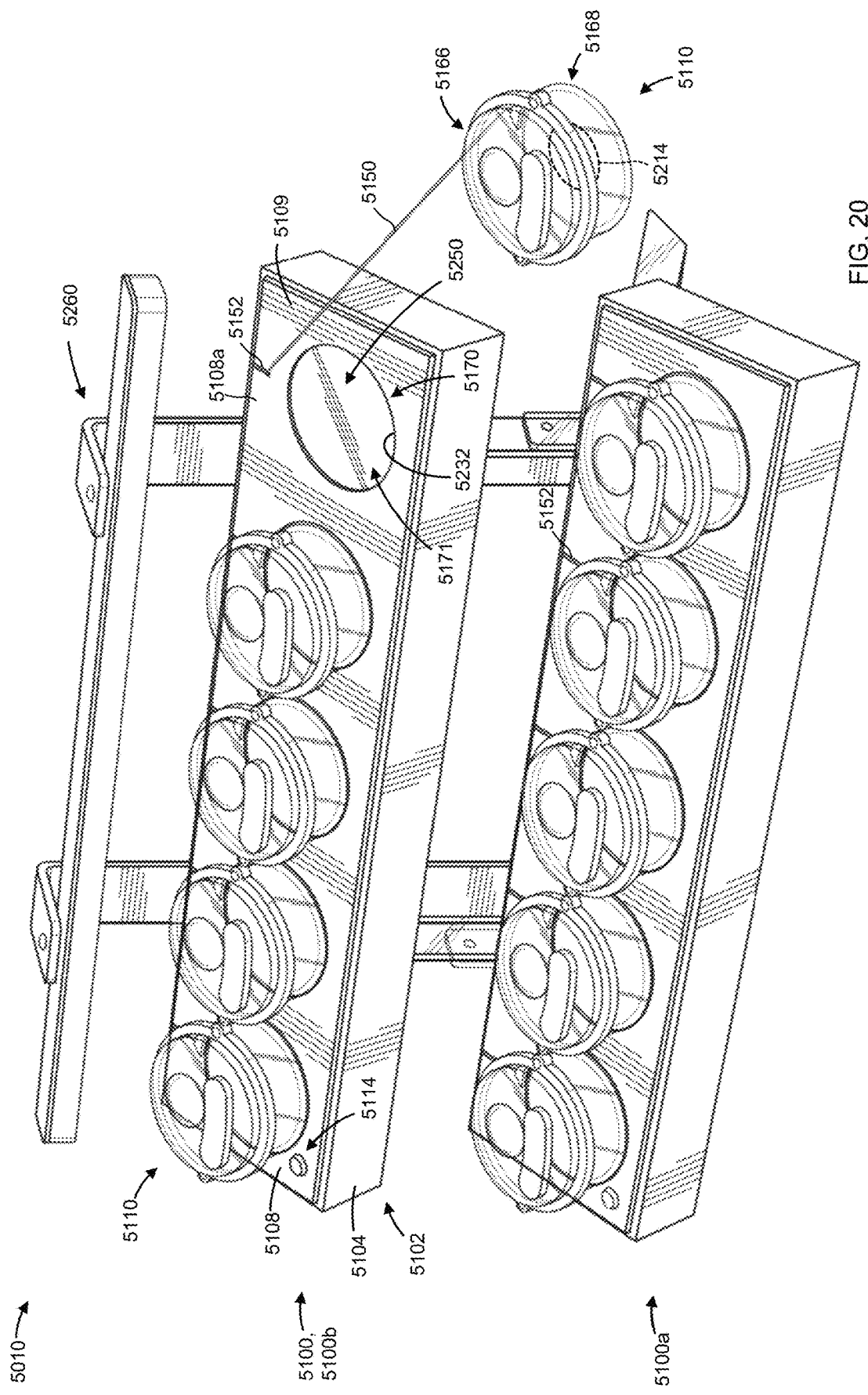
FIG. 20 is a perspective view of an example display system including a plurality of example display assemblies.

Referring to FIG. 20, an example display system 5010 including a plurality of example display assemblies 5100 is illustrated. Each display assembly 5100 has similarities to the display assembly 3100, and like features are identified using like reference characters, incremented by 2000.

Figure 21:
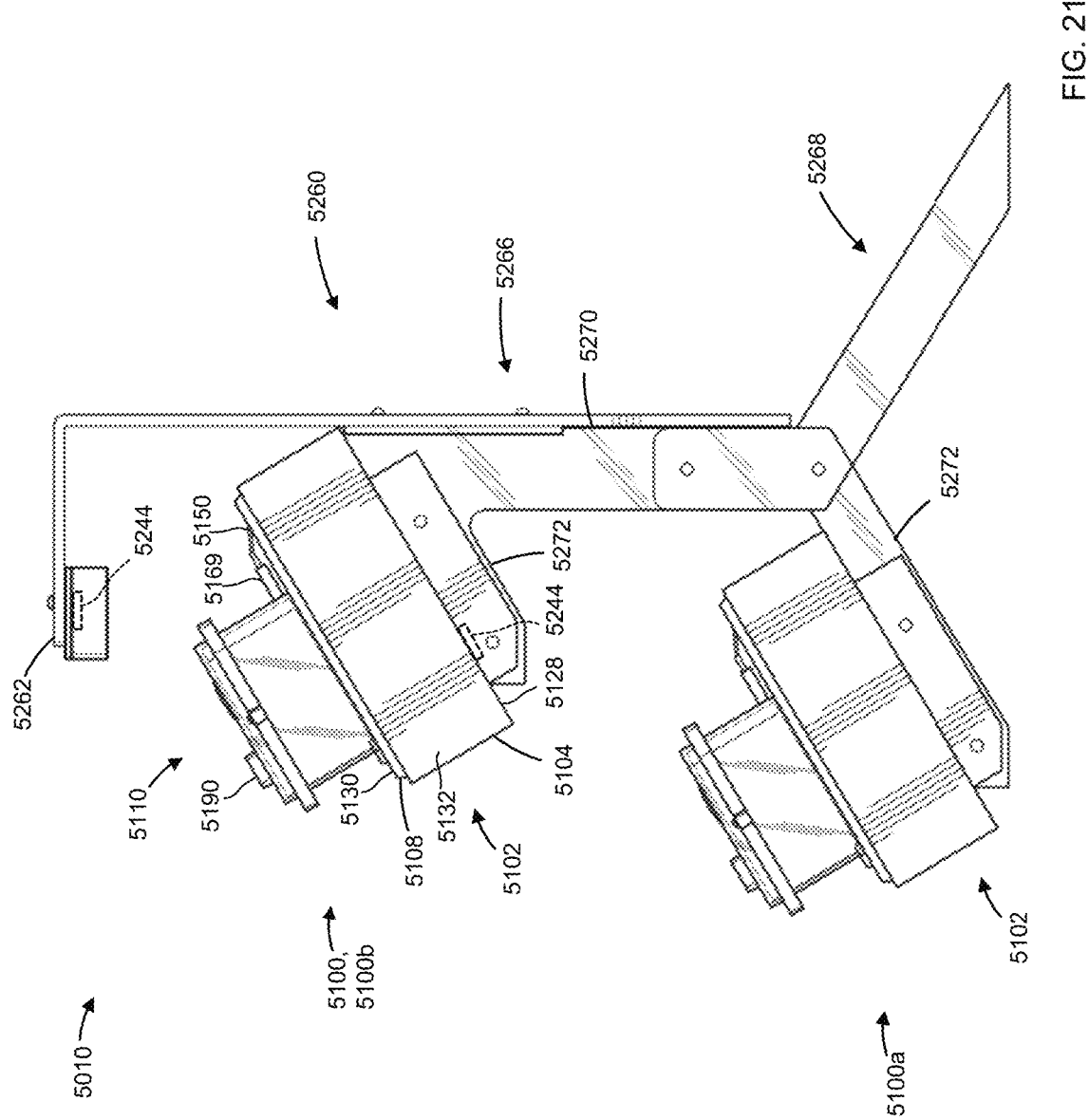
FIG. 21 is a side elevation view of the display system of FIG. 20.

In the example illustrated, the display assembly 5100 includes a housing 5102 having a base 5104 securable to a support surface and a platform 5108 detachably mounted to the base 5104. The base 5104 and the platform 5108 define a generally enclosed interior 5126 (FIG. 22) of the housing 5102 when the platform 5108 is mounted to the base 5104. Referring to FIG. 21, in the example illustrated, the housing 5102 has a bottom wall 5128 bounding the interior 5126 from below, a top wall 5130 vertically opposite the bottom wall 5128 and bounding the interior 5126 from above, and a sidewall 5132 extending between the bottom and top walls 5128, 5130 and bounding the interior 5126 from the sides. In the example illustrated, the base 5104 comprises the bottom wall 5128 and the sidewall 5132, and the platform comprises the top wall 5130.

A plurality of display containers 5110 are supported atop the platform 5108 at predetermined locations. At least a portion of each display container 5110 is generally transparent for viewing one or more articles containable therein for display.

Referring to FIG. 20, in the example illustrated, one or more tether ports 5152 extend through the housing 5102 between the interior 5126 and an exterior of the housing 5102. In the example illustrated, the assembly 5100 includes a plurality of the tether ports 5152 in the platform 5108 (one for each display container 5110), and the tether ports 5152 comprise slits open to a rear edge of the platform 5108 in the example illustrated.

Figure 23:
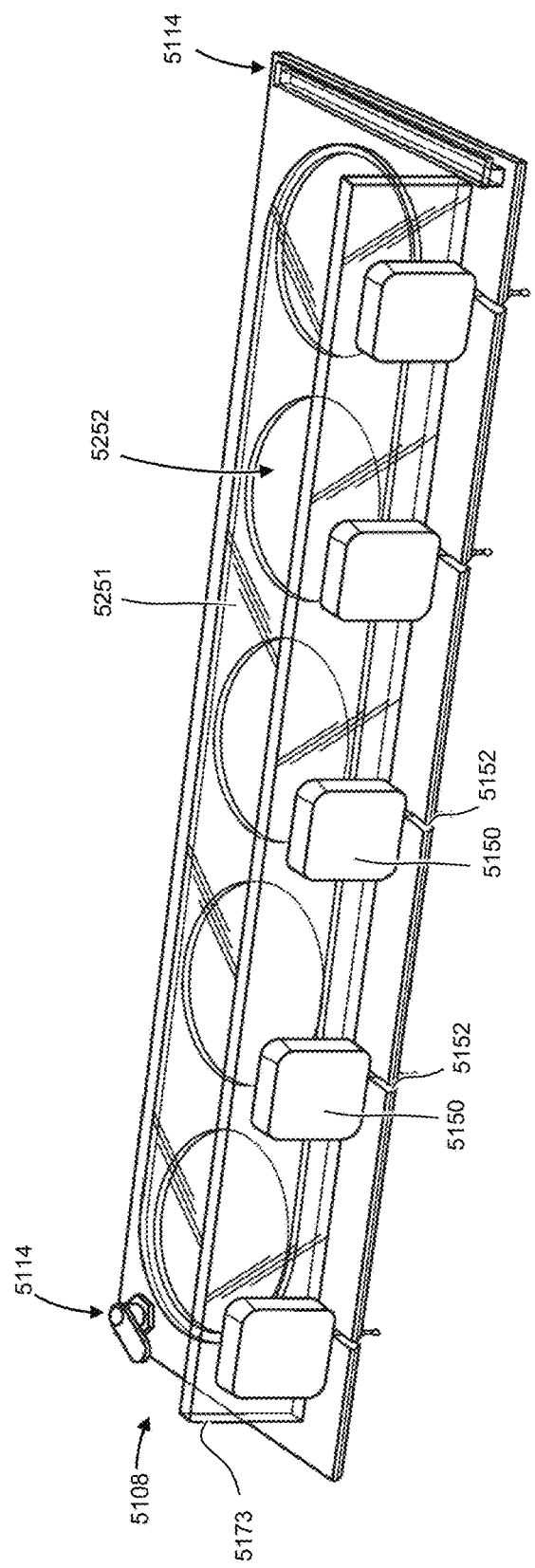
FIG. 23 is an underside view of platform and tether portions of the display assembly of FIG. 22.

A plurality of retractable tethers 5150 are mounted to the platform 5108 in the interior 5126 of the housing 5102 (see also FIG. 23). The tethers 5150 extend through the one or more tether ports 5152 and fasten corresponding display containers 5110 to the platform 5108. Each tether 5150 permits limited movement of a display container 5110 away from a corresponding predetermined location to facilitate viewing and/or aroma sampling of the articles, and urges the display container 5110 back to the predetermined location.

Referring to FIG. 20, in the example illustrated, a locking mechanism 5114 is mounted to the housing 5102. The locking mechanism 5114 is configurable between a locked configuration in which the platform 5108 is securely locked to the base 5104 to prevent detachment of the platform 5108 from the base 5104 (e.g. through engagement of latch and strike surfaces), and an unlocked configuration in which the platform 5108 is unlocked from the base 5104 (e.g. through movement of one or more of the latch surfaces clear of the strike surfaces) to permit detachment of the platform 5108 from the base 5104 for transporting the display containers 5110 and tethers 5150 away from the base 5104.

In the example illustrated, each predetermined location for the display containers 5110 is defined by a corresponding seat 5170 for supporting a corresponding display container 5110 at the predetermined location. In the example illustrated, the platform 5108 has an exterior top surface 5108a and each seat 5170 comprises a seat recess 5171 in the top surface 5108a of the platform 5108 for receiving a bottom portion 5168 of the display container 5110. In the example illustrated, each seat recess 5171 corresponds in size and shape to the bottom portion 5168 of the display containers 5110 for nesting of the bottom portions 5168 in the seat recesses 5171. Referring to FIG. 21, in the example illustrated, a flange portion 5169 is fixed to and projects from an exterior side surface of the display container 5110 for attachment of the display container 5110 to a corresponding tether 5150. The flange portion 5169 is at an elevation above the seat recess 5171 when the display container 5110 is seated therein, and is pulled by the tether 5150 toward a corresponding tether port 5152. This can help urge the display container 5110 toward a predetermined orientation about the container axis 5164 when the display container 5110 is in the seat recess 5171. In the example illustrated, when the display container 5110 is in the predetermined location and orientation, the flange portion 5169 is positioned toward a rear of the display assembly 5100 and generally in alignment with a corresponding tether port 5152, and a removable scent plug 5190 of the display container 5110 is positioned toward a front of the display assembly 5100.

Referring to FIG. 20, in the example illustrated, the seat recesses 5171 and the bottom portions 5168 of the display containers 5110 are generally cylindrical. In other examples, the seat recesses and the bottom portions of the display containers may be shaped differently. For example, in some examples, the seat recesses may be generally prismatic (e.g. having a generally square-shaped profile when viewed from above), and the bottom portions of the display containers may correspond in shape to the seat recesses and/or have a plurality of feet or other support members positionable in the seat recesses for supporting the display containers in the predetermined locations.

Figure 22:
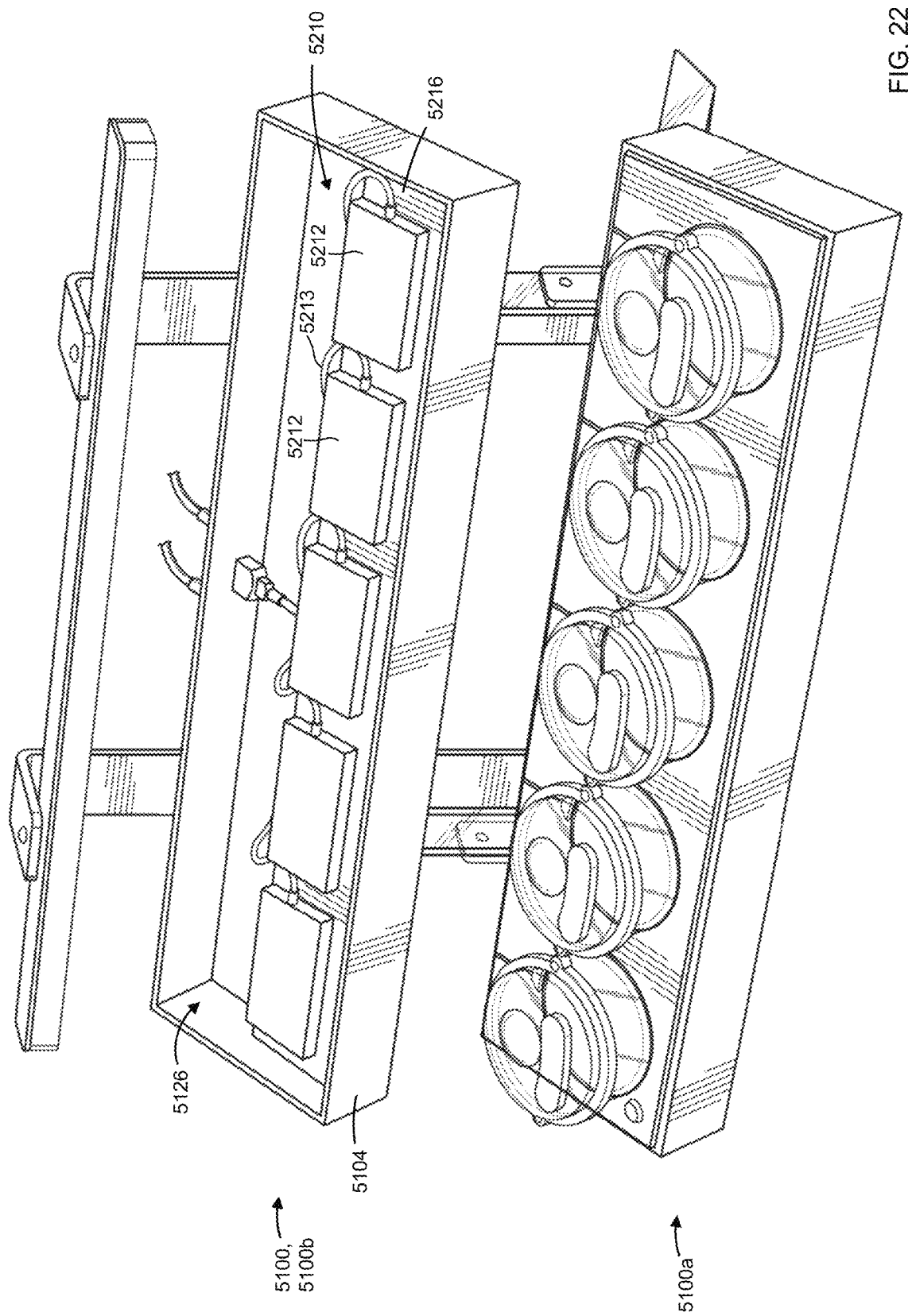
FIG. 22 is another perspective view of the display system of FIG. 20, with a platform of one of the display assemblies shown removed from a base.

Referring to FIG. 22, in the example illustrated, each display assembly 5100 includes an optional interaction detection system 5210 including one or more sensors 5212 in the interior 5126 of the housing 5102. The sensors 5212 are operable to detect whether the predetermined locations have the display containers 5110 positioned thereat. In the example illustrated, the sensors 5212 are configured to detect which predetermined locations have a corresponding display container 5110 positioned thereat and which predetermined locations do not have a corresponding display container 5110 positioned thereat (which can be indicative of removal of and interaction with those display containers 5110).

The sensors 5212 can be used to, for example, dynamically control visual components of or adjacent to the display assembly 5100 based on user interaction with the display containers 5110 (e.g. in response to detection by the sensors that one or more of the display containers have been moved away from corresponding predetermined locations or returned to the predetermined locations, which can indicate interaction with and interest in the display container being removed or returned). The visual components can comprise, for example, lighting components (e.g. light emitting diodes (LEDs)), display screens (e.g. LCD or LED display screens), and/or informational content about the articles contained in the display containers 5110 (e.g. about a specific cannabis strain contained in the container 5110).

In the example illustrated, the interaction detection system 5210 includes a plurality of the sensors 5212, with each predetermined location having a corresponding sensor 5212 positioned adjacent thereto. Each sensor is operable to detect whether a corresponding predetermined location has a corresponding display container 5110 positioned thereat. In the example illustrated, the sensors 5212 are positioned under and adjacent corresponding seat recesses 5171 (when the platform 5108 is mounted to the base 5104). In the example illustrated, the detection system 5210 includes a plurality of identification tags 5214 (one of which is shown schematically in dashed lines in FIG. 20) attached to corresponding display containers 5110 for identifying each display container 5110, and the sensors 5212 comprise tag readers operable to sense proximity of corresponding tags for detecting removal of the tags 5214 from, and return of the tags 5214 to, the predetermined locations. In the example illustrated, the tags 5214 are attached to the bottom portion 5168 of the display containers 5110 (e.g. to an underside surface or in the interior of the display containers). In the example illustrated, the identification tags 5214 comprise near field communication (NFC) chips and the sensors 5212 comprise NFC readers for detection of the NFC chips (e.g. of a proximity of the NFC chips to the NFC readers), and in some examples, identification of the display container 5110 to which the tag 5214 is attached.

In some examples, the sensors 5212 are operable to generate sensor signals, and one or more processors can be provided and configured to control the visual components based on the sensor signals. In some examples, the one or more processors can be configured to select informational content from a plurality of predefined information profiles stored on computer-readable memory based on the sensor signals for display of the informational content on a display screen adjacent the housing 5102. The displayed informational content can, for example, provide information about the specific articles (e.g. a specific cannabis strain) in a display container 5110 detected as being removed from a corresponding predetermined location.

In the example illustrated, the housing 5102 is sized and shaped to be portable (prior to being secured to the support surface), and the interaction detection system 5210 (and the lighting system 5240 described below) is integrated into the housing 5102 to help with portability and facilitate ease of shipping, transport, installation, and/or use of the display assembly 5100. Referring to FIG. 22, in the example illustrated, the sensors 5212 are supported by the base 5104 of the housing 5102 and the platform 5108 is detachable and movable away from the base 5104 without the sensors 5212. This can allow for detachment of the platform 5108 (with the containers and tethers) without having to, for example, disconnect the sensors and/or other detection, lighting, and/or display screen components from each other and/or a power source. Referring to FIG. 22, the sensors 5212 are mounted on a removable sensor panel 5216 supported in the interior 5126 of the housing 5102. Referring to FIG. 23, the tethers 5150 are mounted to a tether panel 5173 fixed to the platform 5108 and positioned in the interior 5126 of the housing 5102 adjacent the sensors 5212 (and the sensor panel 5216) when the platform 5108 is attached to the base 5104. In the example illustrated, the sensor panel 5216 is oriented horizontally with the sensors 5212 thereatop and positioned vertically between the platform 5108 and the sensor panel 5216. The tether panel 5173 is oriented vertically and positioned rearward of the sensors 5212, between the tethers 5150 (when retracted) and the sensors 5212.

Figure 24:
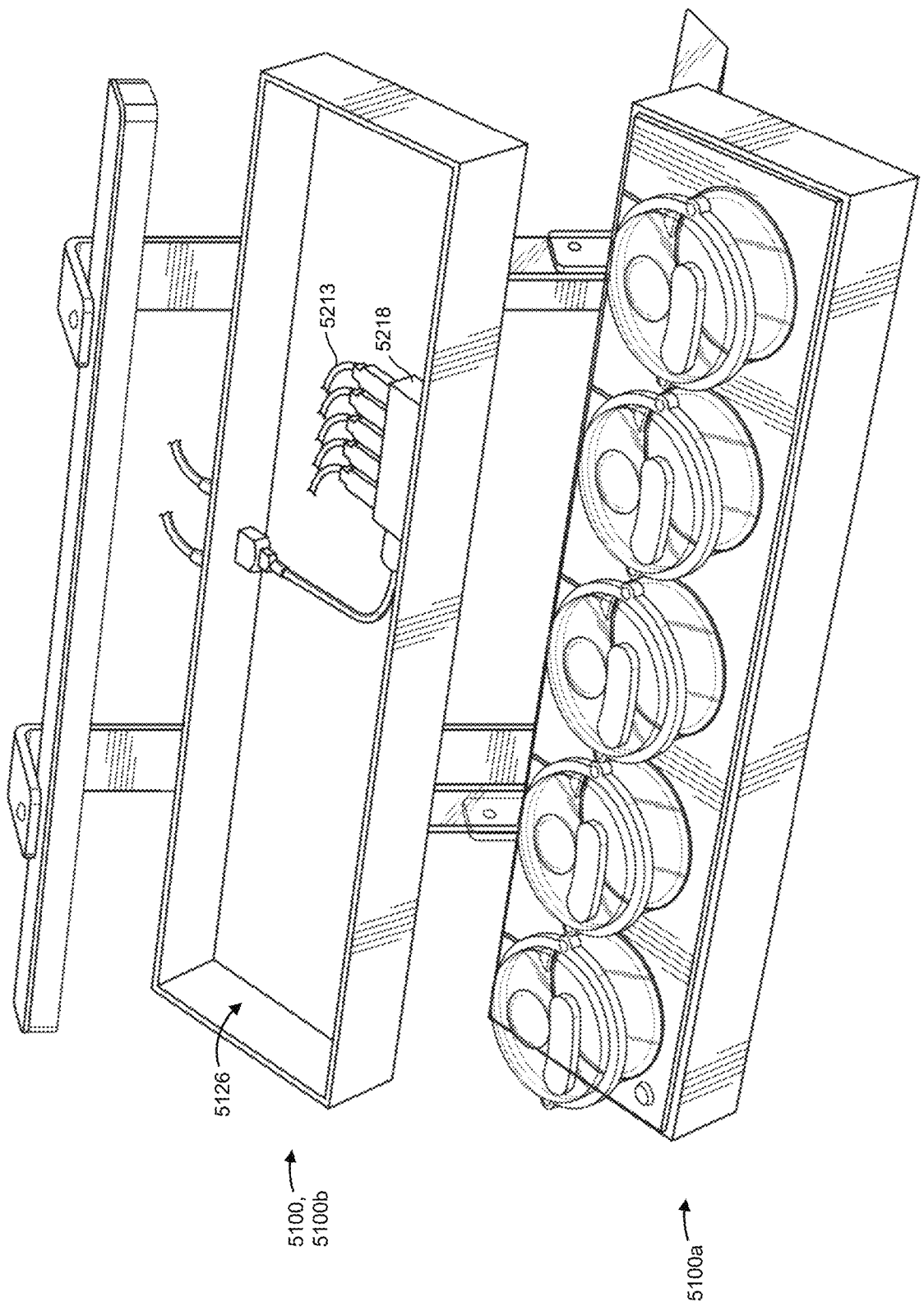
FIG. 24 is another perspective view of the display assembly of FIG. 22, with sensor components of the display assembly shown removed from an interior of the display assembly.

Referring to FIG. 24, the detection system 5210 further includes a sensor hub 5218 in the interior 5126 of the housing 5102 and connected to each sensor 5212 (e.g. for receiving and/or processing the sensor signals, and/or for connection of the sensors 5212 to other system components—e.g. processors, display screens, lighting components, etc.). In the example illustrated, the sensors 5212 are connected to the sensor hub through respective cables 5213 (e.g. USB or other suitable cables). In the example illustrated, the sensor hub 5218 is positioned under the sensor panel 5216, and the sensor panel 5216 is removable from the interior 5126 for accessing the sensor hub 5218 when the platform 5108 is detached from the base 5104.

Referring to FIG. 20, in the example illustrated, the platform 5108 includes a plurality of illuminable portions comprising windows 5250. The illuminable portions are generally non-opaque (i.e. at least partially transparent or translucent) to permit transmission of visible light therethrough for illumination of portions of the display assembly 5100 (e.g. the windows 5250 and display containers 5110 thereatop). In the example illustrated, the platform 5108 includes one window 5250 for each display container 5110.

In the example illustrated, the windows 5250 are discrete and spaced apart from each other along the platform 5108 by opaque portions of the platform 5108. Each window 5250 has an underside comprising an interior surface facing the interior 5126 of the housing and a topside comprising an exterior surface opposite the interior surface. In the example illustrated, each display container 5110 is positioned adjacent (overtop, in the example illustrated) a corresponding window 5250 when seated at a corresponding predetermined location. In other examples, the illuminable portion can comprise a continuous transparent or translucent surface extending along the platform 5108 for supporting a plurality of the display containers 5110.

Referring to FIG. 25, in the example illustrated, the display assembly 5100 can include an optional integrated lighting system 5240 (in addition to or in lieu of the interaction detection system 5210). In the example illustrated, the lighting system 5240 includes one or more interior light sources 5242 in the interior 5126 of the housing 5102. In the example illustrated, the interior light sources 5242 are positioned under the illuminable portion comprising the windows 5250 (when the platform 5108 is attached to the base 5104), and the windows 5250 are illuminable by the interior light sources 5242 from below. The platform 5108 is detachable from the base 5104 without the light sources 5242 (or any other lighting system components in the example illustrated). In the example illustrated, the lighting system 5240 further includes one or more overtop light sources 5244 positioned overtop the display containers 5110 for illuminating the display containers 5110 from above.

Referring to FIG. 20, in the example illustrated, each display container 5110 has a top portion 5166 comprising a lid detachably locked to the bottom portion 5168 of the container 5110. The top portion 5166 and the bottom portion 5168 generally enclose a container interior for containing the articles for display. In the example illustrated, the top and bottom portions 5166, 5168 of the display container are generally transparent (and made from a generally transparent material) to facilitate viewing and illumination of the display containers and the articles therein from below and/or above via the lighting system 5240.

Referring to FIG. 25, in the example illustrated, the interior light sources 5242 comprise one or more light emitting diodes 5243 (LEDs) under the windows 5250 (when the platform 5108 is mounted to the base 5104) and the overtop light sources 5244 comprise one or more light emitting diodes (LEDS) positioned overtop the display containers 5110. The interior light sources 5242 comprise an interior LED strip extending under the windows 5250, and the overtop light source comprises an overtop LED strip extending along the housing 5102 generally overtop the display containers 5110. The lighting system 5240 can further include a power supply for connection of the lighting system 5240 to a power source for powering the lighting system 5240 (e.g. the interior and/or overtop light sources), and a switch for selectively activating and deactivating the lighting system 5240 (e.g. the interior and/or overtop light sources).

Referring to FIG. 20, in the example illustrated, the platform 5108 includes a panel portion 5109 attachable to the base 5104 and a plurality of apertures 5232 spaced apart from each other along the panel portion 5109 and passing through the panel portion 5109 between the interior 5126 and the exterior of the housing 5102. In the example illustrated, each window 5250 extends across a corresponding aperture 5232 and the apertures 5232 define a periphery of the windows 5250 and the seat recesses 5171. Referring to FIGS. 26 and 26A, in the example illustrated, each aperture 5232 is defined by an aperture side surface 5234 extending between the top surface 5108a of the platform 5108 and the underside of the platform 5108. Each seat recess 5171 is bounded from the sides by at least an upper portion of the aperture side surface 5234, and from below by a corresponding window 5250.

Referring to FIG. 26A, in the example illustrated, each window 5250 includes a base portion 5252 extending across a corresponding aperture 5232. In the example illustrated, the base portions 5252 extend under the apertures 5232 and close the apertures 5232 from below. In the example illustrated, the base portions 5252 of the windows 5250 are part of a common window panel 5251 (FIG. 23) mounted to the underside of the panel portion 5109 of the platform 5108 and extending under the apertures 5232. In the example illustrated, the base portion 5252 of the windows 5250 is translucent, and can have a white appearance, for example. In the example illustrated, the panel portion 5109 of the platform 5108 (and the base 5104) is generally opaque, which can help provide a visual contrast to the windows 5250 when the windows 5250 are illuminated.

Referring to FIG. 26A, in the example illustrated, the housing 5102 can include an optional information display system 5196 integrated with the windows 5250. In the example illustrated, each window 5250 includes an optional transparent cover portion 5254 positioned in the aperture 5232 overtop of the base portion 5252 of the window 5250. In the example illustrated, the display containers 5110 are supported atop the cover portion 5254 when in the seats 5170. In other examples, the cover portion 5254 can be omitted and the display containers 5110 can be supported directly on the base portion 5252 of the windows 5250. In the example illustrated, each window 5250 further includes optional informational content 5257 between the base portion 5252 and the cover portion 5254. The informational content 5257 is visible from an exterior of the housing 5102 when the display containers 5110 are removed from their seats 5170, and provides information about the articles contained in corresponding display containers 5110. The informational content 5257 can include, for example, text and/or graphics relating to the articles in corresponding display containers 5110.

In the example illustrated, each cover portion 5254 is removable from the aperture 5232 for changing the informational content. In the example illustrated, the cover portion 5254 corresponds in shape and size to the aperture 5232 for nesting of the cover portion 5254 therein in close fit, and includes a removal feature to facilitate removal of the cover portion 5254 from the aperture 5232. In the example illustrated, the removal feature comprises an indent 5256 in a periphery of the cover portion 5254 to accommodate insertion of a finger or tool for lifting the cover portion 5254 out from the aperture 5232.

In the example illustrated, the informational content 5257 is provided on a removable information sheet 5258 held between the base portion 5252 and the cover portion 5254 of the window 5250. In the example illustrated, the information sheet 5258 corresponds in shape and size to the aperture 5232 for nesting of the information sheet 5258 in the aperture 5232 between the base portion 5252 and the cover portion 5254 of the window 5250. In the example illustrated, information sheet 5258 is generally transparent (and made from a generally transparent material), which can facilitate emphasis of the informational content on the sheet 5258 when the window 5250 is illuminated. At least some of the informational content on the sheet 5258 can be translucent for being illuminated from below by the interior light source 5242.

In some examples, the interaction detection system 5210 can be used for controlling the lighting system 5240. In such examples, the light sources 5242, 5244 can be controlled (e.g. using one or more processors, or circuits with switch-based sensors) based on input from the sensors 5212. For example, when removal of one of the display containers 5110 from a predetermined location is detected by a corresponding sensor 5212, one or more of the interior light sources 5242 can be activated to, for example, illuminate all the windows 5250 or only the window 5250 corresponding to that display container 5110 (e.g. to highlight the informational content in that specific window 5250). When return of the display container 5110 to the predetermined location is detected by the corresponding sensor 5212, the one or more of the interior light sources 5242 can be deactivated to stop illumination of the previously illuminated window(s) 5250.

In some examples, the interaction detection system 5210 can include sensors comprising, for example, switches configurable from a first state to a second state when a corresponding display container 5110 is moved away from the predetermined location, and from the second state to the first state when the display container 5110 is returned to the predetermined location. The first and second states can be used to control visual components (e.g. activation and deactivation of the interior light sources 5242) associated with that switch and corresponding display container 5110, for example, by closing a corresponding circuit when the switch is in the second state for activating the light source and opening the corresponding circuit when the switch is in the first state for deactivating the light source. In some examples, the switches can comprise, for example, biased switches positioned at the predetermined locations (e.g. in the seats 5170). In such examples, each biased switch can be depressed by a corresponding display container 5110 when seated at the predetermined location for maintaining the switch in the first state, and releasable when the display container 5110 is removed from the predetermined location for biased movement of the switch to the second state.

Referring to FIG. 20, in the example illustrated, the support surface to which the base 5104 of the housing 5102 is securable (e.g. through one or more fasteners) is in the form of a frame 5260 of the system 5010. In the example illustrated, the frame 5260 supports the plurality of the display assemblies 5100, including at least one lower display assembly 5100*a* and at least one upper display assembly 5100*b* above the lower display assembly 5100*a*. Each of the display assemblies 5100*a*, 5100*b* are supported by the frame 5260 at an angled orientation, with a top viewing surface of each display container 5110 inclined from horizontal toward a front of the frame 5260.

Referring to FIG. 21, in the example illustrated, the overtop light sources 5244 (shown schematically in dashed lines in FIG. 21) for the lower display assembly 5100*a* are mounted to an underside of the upper display assembly 5100*b*, and the overtop light sources 5244 for the upper display assembly 5100*b* are mounted to an overhang 5262 of a lighting bracket portion extending from the frame 5260 overtop the upper display assembly 5100*b*.

In the example illustrated, the frame 5260 is reconfigurable between a free-standing configuration in which the frame 5260 can be free standing on (and optionally anchored to) a horizontal support surface, and a wall-mount configuration for hanging the frame 5260 (and display assemblies 5100) on a generally vertical wall surface. The frame 5260 includes a bracket assembly 5266 supporting the display assemblies 5100 and one or more removable legs 5268 mounted to the bracket assembly 5266 (e.g. through one or more removable fasteners) to help support the frame 5260 in the free standing configuration. The one or more legs 5268 are removable from the bracket assembly 5266 to configure the frame 5260 to the wall-mount configuration for anchoring of the bracket assembly 5266 to the vertical wall surface, and the legs are reattachable to the bracket assembly 5266 to configure the frame 5260 to the free-standing configuration.

In the example illustrated, the bracket assembly 5266 includes one or more vertical members 5270 and a plurality of support members 5272 projecting forward from the one or more vertical members 5270 for supporting the display assemblies 5100. The support members 5272 slope downwardly from the one or more vertical members 5270 at an angle for supporting the display assemblies 5100 at the angled orientation. In the example illustrated, the bracket assembly 5266 includes a pair of the vertical members 5270 spaced laterally apart from each other, a pair of lower support members 5272 (one fixed to each vertical member 5270) supporting the lower display assembly 5100*a*, and a pair of upper support members 5272 (one fixed to each vertical member 5270) above the lower support members 5272 and supporting the upper display assembly 5100*b*. The frame 5260 includes a pair of the removable legs 5268, with each leg 5268 extending rearwardly from a lower end of a corresponding vertical member 5270. The legs 5268 cooperate with the lower support members 5272 to support the frame 5260 in the free-standing configuration, and the frame 5260 can optionally be anchored to the horizontal surface in the free-standing configuration through one or more fasteners passing through the lower support members 5272 and/or legs 5268. In the wall mount configuration, the legs 5268 are removed and the vertical members 5270 can be anchored to the wall surface (e.g. through one or more fasteners passing through the vertical members 5270 and/or brackets attached thereto).

Figure 27:
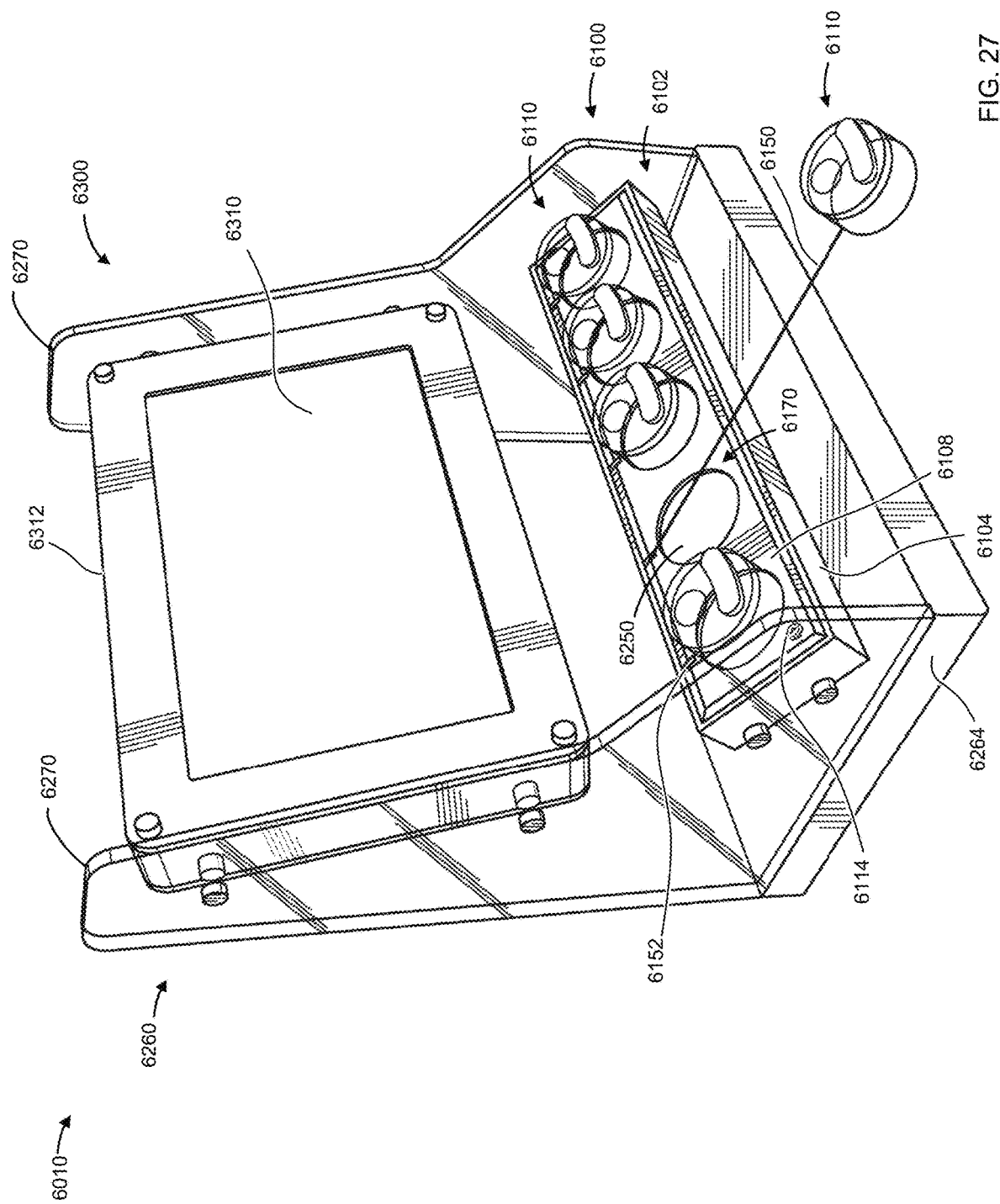
FIG. 27 is a perspective view of another example display system.

Referring to FIG. 27, another example display system 6010 is illustrated. The display system 6010 has similarities to the display system 5010, and like features are identified using like reference characters, incremented by 1000.

In the example illustrated, the display system 6010 includes a frame 6260, a display assembly 6100 supported by the frame 6260, and an integrated visual display device 6300 supported by the frame 6260 adjacent the display assembly 6100.

In the example illustrated, the display assembly 6100 includes a housing 6102 having a base 6104 secured to a support surface (of the frame 6260, in the example illustrated) and a platform 6108 detachably mounted to the base 6104. The base 6104 and the platform 6108 define a generally enclosed interior of the housing 6102 (e.g. similar to that shown in FIG. 22 for the display assembly 5100). A plurality of display containers 6110 are supported atop the platform 6108 at predetermined locations. In the example illustrated, each predetermined location for the display containers 6110 is defined by a corresponding delineated seat 6170 (which is recessed into the platform in the example illustrated) for retaining a corresponding display container 6110 at the predetermined location. A plurality of tether ports 6152 (one for each display container 6110) extend through the platform 6108. A plurality of retractable tethers 6150 are mounted to the platform 6108 in the interior of the housing 6102. The tethers 6150 extend through corresponding tether ports 6152 to fasten corresponding display containers 6110 to the platform 6108, and urge the display containers 6110 toward corresponding seats 6170. A locking mechanism 6114 is mounted to the housing 6102 for selective locking and unlocking of the platform 6108 to and from the base 6104.

The display assembly 6100 can include an optional interaction detection system (e.g. similar to interaction detection system 5210) having one or more sensors (e.g. similar to sensors 5212) and/or sensor hub (e.g. similar to sensor hub 5218) in the interior of the housing 6102. The sensors can be used to, for example, dynamically control visual components of, or adjacent to, the display system 6010 based on user interaction with the display containers 6110. In the example illustrated, the sensors can be used to dynamically control output of visual information on the display device 6300 and/or control the lighting system described below. In the example illustrated, the display device 6300 includes an electronic visual display screen 6310 mounted in a casing 6312 for output of information (e.g. regarding the articles on display) in visual form. The display assembly 6100 further includes an integrated lighting system (e.g. similar to lighting system 5240). The lighting system of display assembly 6100 includes one or more interior light sources (e.g. similar to interior light sources 5242) in the interior of the housing 6102 for illumination of the windows 6250 and display containers 6110 from below. The lighting system of the display assembly 6100 can further include one or more overtop light sources for illumination of the display containers 6110 from above. The overtop light sources for the display assembly 6100 can be positioned, for example, on an underside of the casing 6312 of the display device 6300 directed generally toward the display containers 6110.

In the example illustrated, the frame 6260 comprises the support surface to which the base 6104 of the housing 6102 is secured. In the example illustrated, both the display assembly 6100 and the display device 6300 are mounted to the frame 6260. Both the display assembly 6100 and the display device 6300 are supported by the frame 6260 at an angled orientation, with a top viewing surface of each display container 6110 and the display screen 6310 inclined from horizontal toward a front of the frame 6260 to facilitate comfortable viewing of the screen 6310 and the articles in the display containers 6110.

In the example illustrated, the frame 6260 includes a frame base 6264 for supporting the display system 6010 in an upright free-standing configuration, and a pair of vertically oriented frame members 6270 (in the form of panels in the example illustrated) spaced laterally apart from each other and extending upwardly from laterally opposite sides of the base 6264. The display assembly 6100 and the display device 6300 are positioned laterally between and fixed to the frame members 6270. In the example illustrated, the display assembly 6100 is supported by the frame members 6270 at an elevation above the base 6264, and the display device 6300 is supported by the frame members 6270 at an elevation above and generally rearward of the display assembly 6100.

Figure 28:
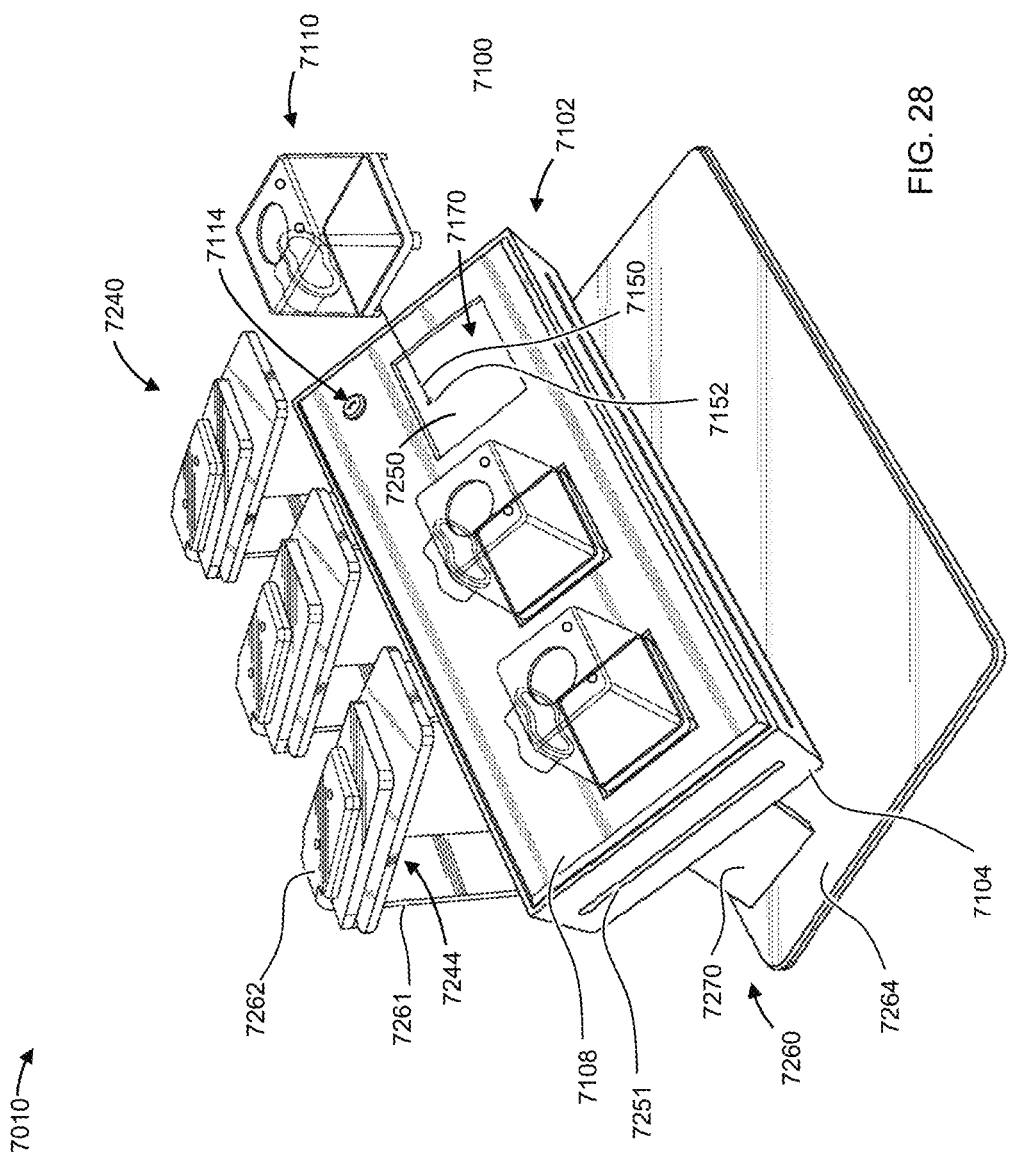
FIG. 28 is a perspective view of another example display system.

Referring to FIG. 28, another example display system 7010 is illustrated. The display system 7010 has similarities to the display system 5010, and like features are identified using like reference characters, incremented by 2000.

In the example illustrated, the display system 7010 includes a frame 7260 and a display assembly 7100 supported by the frame 7260. The display assembly 7100 includes a housing 7102 having a base 7104 secured to a support surface of the frame 7260, and a platform 7108 detachably mounted to the base 7104. In the example illustrated, the base 7104 and the platform 7108 cooperate to generally enclose an interior of the housing 7102 when the platform 7108 is mounted to the base 7104. In the example illustrated, a plurality of display containers 7110 are supported atop the platform 7108 at predetermined locations defined by recessed seats 7170. In the example illustrated, the display containers 7110 are generally cubic in shape, and the recessed seats 7170 correspond in size and shape (and are generally square shaped, in the example illustrated) to a bottom portion of the containers 7110 for nesting of the bottom portions of the containers 7110 in corresponding seats 7170. In the example illustrated, the assembly 7100 includes a plurality of the tether ports 7152 in the platform 7108 (one tether port for each display container 7110). In the example illustrated, each tether port 7152 comprises an aperture in a floor of the recessed seats 7170, and is covered by a corresponding display container 7110 when the display container 7110 is in a corresponding seat 7170. A plurality of retractable tethers 7150 are mounted in the interior of the housing 7102. Each tether 7150 extends through a corresponding tether port 7152 to fasten a corresponding display container 7110 to the housing 7102 and urge the display container 7110 back into its seat 7170. In the example illustrated, the display assembly 6100 has a locking mechanism 7114 mounted to the housing 7102 for selective locking and unlocking of the platform 7108 to and from the base 7104.

The display assembly 7100 can include an optional interaction detection system (e.g. similar to interaction detection system 5210). In the example illustrated, the display assembly 7100 includes an integrated lighting system 7240 (e.g. similar to the lighting system 5240). The lighting system 7240 includes one or more interior light sources (e.g. similar to interior light sources 5242) in the interior of the housing 7102 for illumination of the windows 7250 (which define a floor of corresponding seats 7170 in the example illustrated) and the display containers 7110 from below. In the example illustrated, the housing 7102 has side windows 7251 in a sidewall of the base 7104, and one or more of the interior light sources can be positioned adjacent the side windows 7151 for illumination thereof.

In the example illustrated, the lighting system 7240 includes a plurality of overtop light sources 7244 positioned overtop of the display containers 7110 for illuminating the display containers 7110 from above. In the example illustrated, a plurality of lighting brackets 7261 are coupled to the housing 7102 (e.g. directly or through the frame 7260). In the example illustrated, each bracket 7261 has an overhang 7262 extending over a corresponding predetermined location (i.e. seat 7170 in the example illustrated). One or more of the overtop light sources 7244 is mounted to an underside of each overhang 7262 for illuminating corresponding display containers 7110 positioned below the overhangs 7262.

In the example illustrated, the frame 7260 includes a frame base 7264 for supporting the display system 7010 in an upright free standing configuration, and a plurality of vertically oriented frame members 7270 spaced laterally apart from each other along the frame base and extending upwardly from the frame base 7264. In the example illustrated, the base 7104 of the housing 7102 is supported atop and fixed to the frame members 7270.

Referring to FIG. 29, another example display system 8010 is illustrated. The display system 8010 has similarities to the display system 7010, and like features are identified using like reference characters, incremented by 1000. In the example illustrated, the display system 8010 includes a frame 8260 and a display assembly 8100 supported by the frame. In the example illustrated, the display assembly 8100 is similar to the display assembly 7100, but adapted for use with a single display container.

The invention claimed is:
1. An interactive display assembly, comprising:
a) a housing including a base securable to a support surface and a platform detachably mounted to the base, the base and platform defining a generally enclosed interior of the housing;
b) a plurality of display containers supported atop the platform at predetermined locations, at least a portion of each display container being generally transparent for viewing one or more articles containable therein for display;

c) one or more tether ports extending through the housing between the interior and an exterior of the housing;

d) a plurality of retractable tethers mounted to the platform in the interior of the housing, the tethers extending through the one or more tether ports and fastening corresponding display containers to the platform, and each tether permitting limited movement of a corresponding display container away from a corresponding predetermined location to facilitate viewing of the articles and urging the display container back to the predetermined location; and e) an interaction detection system including one or more sensors in the interior of the housing, the one or more sensors operable to detect whether the predetermined locations have the display containers positioned thereat.

2. The display assembly of claim 1, wherein the one or more sensors include a plurality of sensors positioned adjacent to corresponding predetermined locations, each sensor operable to detect whether a corresponding predetermined location has a corresponding display container positioned thereat.

3. The display assembly of claim 1, wherein the sensors are supported by the base of the housing and the platform is detachable away from the base without the sensors.

4. The display assembly of claim 3, wherein the sensors are mounted on a removable sensor panel supported in the interior of the housing.

5. The display assembly of claim 4, wherein the detection system further includes a sensor hub in the interior of the housing under the sensor panel and connected to each sensor for communication therewith.

6. The display assembly of claim 1, wherein the detection system includes a plurality of identification tags attached to corresponding display containers, and each sensor comprises a tag reader operable to sense proximity of a corresponding tag.

7. The display assembly of claim 1, wherein the plurality of tethers are mounted to a tether panel in the interior of the housing adjacent the sensors and fixed to the platform.

8. The display assembly of claim 1, wherein each predetermined location is defined by a seat for supporting a corresponding display container at the predetermined location.

9. The display assembly of claim 8, wherein the platform has a top surface and each seat comprises a seat recess in the top surface of the platform for receiving a bottom portion of the display container, and wherein the one or more sensors are positioned under and adjacent the seat recesses.

10. The display assembly of claim 1, further comprising a locking mechanism configurable between a locked configuration in which the platform is securely locked to the base to prevent detachment of the platform from the base, and an unlocked configuration in which the platform is unlocked from the base to permit detachment of the platform from the base for transporting the display containers and tethers away from the base.

11. An interactive display assembly, comprising:

a) a housing including a base securable to a support surface, a platform detachably mounted to the base, and a generally enclosed interior bounded by at least the platform;

b) a plurality of retractable tethers mounted to the platform in the interior of the housing, the tethers for fastening corresponding display containers to the platform and urging the display containers to corresponding predetermined locations adjacent the platform; and c) an interaction detection system including one or more sensors in the interior of the housing adjacent the predetermined locations, the one or more sensors operable to detect whether the predetermined locations have the display containers positioned thereat.

* * * * *